United States Patent
Betz et al.

(10) Patent No.: US 9,208,229 B2
(45) Date of Patent: Dec. 8, 2015

(54) ANCHOR TEXT SUMMARIZATION FOR CORROBORATION

(75) Inventors: Jonathan T. Betz, Summit, NJ (US); Shubin Zhao, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 787 days.

(21) Appl. No.: 11/394,552

(22) Filed: Mar. 31, 2006

(65) Prior Publication Data

US 2007/0143282 A1    Jun. 21, 2007

Related U.S. Application Data

(63) Continuation-in-part of application No. 11/097,688, filed on Mar. 31, 2005, now Pat. No. 8,682,913.

(51) Int. Cl.
  *G06F 17/30* (2006.01)
  *G06F 17/27* (2006.01)

(52) U.S. Cl.
  CPC ........ G06F 17/30864 (2013.01); G06F 17/278 (2013.01)

(58) Field of Classification Search
  CPC .................... G06F 17/30864; G06F 17/278
  See application file for complete search history.

(56) References Cited

U.S. PATENT DOCUMENTS

| | | | |
|---|---|---|---|
| 5,010,478 A | 4/1991 | Deran ............................ 364/200 |
| 5,133,075 A | 7/1992 | Risch ............................ 395/800 |
| 5,347,653 A | 9/1994 | Flynn et al. | |
| 5,440,730 A | 8/1995 | Elmasri et al. | |
| 5,475,819 A | 12/1995 | Miller et al. ................... 709/203 |
| 5,519,608 A | 5/1996 | Kupiec ...................... 364/419.08 |
| 5,546,507 A * | 8/1996 | Staub ............................... 706/60 |
| 5,560,005 A | 9/1996 | Hoover et al. ................... 707/10 |
| 5,574,898 A | 11/1996 | Leblang et al. ................... 707/1 |
| 5,675,785 A | 10/1997 | Hall et al. | |
| 5,680,622 A | 10/1997 | Even | |
| 5,694,590 A | 12/1997 | Thuraisingham et al. .... 395/600 |
| 5,701,470 A | 12/1997 | Joy et al. | |
| 5,717,911 A | 2/1998 | Madrid et al. ................. 395/602 |
| 5,717,951 A | 2/1998 | Yabumoto ...................... 395/831 |
| 5,724,571 A | 3/1998 | Woods | |
| 5,778,373 A | 7/1998 | Levy et al. ..................... 707/100 |
| 5,778,378 A | 7/1998 | Rubin ........................... 707/103 |
| 5,787,413 A | 7/1998 | Kauffman et al. ................ 707/2 |

(Continued)

FOREIGN PATENT DOCUMENTS

| | | |
|---|---|---|
| JP | 5-174020 | 7/1993 |
| JP | 11-265400 | 9/1999 |

(Continued)

OTHER PUBLICATIONS

Agichtein, E., et al., "Snowball Extracting Relations from Large Plain-Text Collections," Columbia Univ. Computer Science Dept. Technical Report CUCS-033-99, Dec. 1999, pp. 1-13.

(Continued)

*Primary Examiner* — Daniel Kinsaul

(57) ABSTRACT

A system and method for corroborating a set of facts. If the anchor text of the references to a document matches the name of a set of facts, the referenced document is used to corroborate the set of facts. By analyzing the anchor text of the references to the document, the system is capable of determining if a document is relevant to the set of facts. These documents can then be used to corroborate or refute the facts, thereby improving their overall quality.

25 Claims, 11 Drawing Sheets

(56) References Cited

U.S. PATENT DOCUMENTS

| | | | |
|---|---|---|---|
| 5,793,966 A | 8/1998 | Amstein et al. | 395/200.33 |
| 5,802,299 A * | 9/1998 | Logan et al. | 709/218 |
| 5,815,415 A | 9/1998 | Bentley et al. | |
| 5,819,210 A | 10/1998 | Maxwell, III et al. | 704/9 |
| 5,819,265 A | 10/1998 | Ravin et al. | |
| 5,822,743 A | 10/1998 | Gupta et al. | |
| 5,826,258 A | 10/1998 | Gupta et al. | 707/4 |
| 5,838,979 A | 11/1998 | Hart et al. | |
| 5,909,689 A | 6/1999 | Van Ryzin | |
| 5,920,859 A | 7/1999 | Li | 707/5 |
| 5,943,670 A | 8/1999 | Prager | 707/5 |
| 5,956,718 A | 9/1999 | Prasad et al. | 707/10 |
| 5,974,254 A | 10/1999 | Hsu | |
| 5,987,460 A | 11/1999 | Niwa et al. | 707/6 |
| 6,006,221 A | 12/1999 | Liddy et al. | 707/5 |
| 6,018,741 A | 1/2000 | Howland | |
| 6,038,560 A * | 3/2000 | Wical | 707/5 |
| 6,044,366 A | 3/2000 | Graffe et al. | 707/2 |
| 6,052,693 A | 4/2000 | Smith et al. | 707/104 |
| 6,064,952 A | 5/2000 | Imanaka et al. | 704/9 |
| 6,073,130 A | 6/2000 | Jacobson et al. | 707/5 |
| 6,078,918 A | 6/2000 | Allen et al. | |
| 6,112,203 A | 8/2000 | Bharat et al. | 707/5 |
| 6,112,210 A | 8/2000 | Nori et al. | |
| 6,122,647 A * | 9/2000 | Horowitz et al. | 715/205 |
| 6,134,555 A | 10/2000 | Chadha et al. | 707/102 |
| 6,138,270 A | 10/2000 | Hsu | |
| 6,182,063 B1 | 1/2001 | Woods | |
| 6,202,065 B1 | 3/2001 | Wills | 707/5 |
| 6,212,526 B1 | 4/2001 | Chaudhuri et al. | 707/102 |
| 6,240,546 B1 | 5/2001 | Lee et al. | 717/4 |
| 6,263,328 B1 | 7/2001 | Coden et al. | 707/3 |
| 6,263,358 B1 * | 7/2001 | Lee et al. | 718/100 |
| 6,266,805 B1 * | 7/2001 | Nwana et al. | 717/104 |
| 6,285,999 B1 | 9/2001 | Page | 707/5 |
| 6,289,338 B1 | 9/2001 | Stoffel et al. | 707/3 |
| 6,311,194 B1 | 10/2001 | Sheth et al. | 707/505 |
| 6,314,555 B1 * | 11/2001 | Ndumu et al. | 717/101 |
| 6,327,574 B1 | 12/2001 | Kramer et al. | 705/14 |
| 6,349,275 B1 | 2/2002 | Schumacher et al. | 704/8 |
| 6,377,943 B1 | 4/2002 | Jakobsson | 707/2 |
| 6,397,228 B1 | 5/2002 | Lamburt et al. | |
| 6,438,543 B1 | 8/2002 | Kazi et al. | |
| 6,470,330 B1 | 10/2002 | Das et al. | |
| 6,473,898 B1 | 10/2002 | Waugh et al. | 717/168 |
| 6,487,495 B1 | 11/2002 | Gale et al. | 701/209 |
| 6,502,102 B1 | 12/2002 | Haswell et al. | 707/102 |
| 6,519,631 B1 | 2/2003 | Rosenschein et al. | 709/217 |
| 6,556,991 B1 | 4/2003 | Borkovsky | |
| 6,565,610 B1 | 5/2003 | Wang et al. | |
| 6,567,846 B1 | 5/2003 | Garg et al. | 709/218 |
| 6,567,936 B1 | 5/2003 | Yang et al. | 714/37 |
| 6,572,661 B1 | 6/2003 | Stern | 715/501.1 |
| 6,578,032 B1 * | 6/2003 | Chandrasekar et al. | 1/1 |
| 6,584,464 B1 | 6/2003 | Warthen | 707/4 |
| 6,584,646 B2 * | 7/2003 | Fujita | 16/342 |
| 6,594,658 B2 | 7/2003 | Woods | |
| 6,606,625 B1 | 8/2003 | Muslea et al. | 707/6 |
| 6,606,659 B1 | 8/2003 | Hegli et al. | 709/225 |
| 6,609,123 B1 | 8/2003 | Cazemier et al. | 707/4 |
| 6,636,742 B1 | 10/2003 | Torkki et al. | |
| 6,643,641 B1 | 11/2003 | Snyder | 707/4 |
| 6,665,659 B1 | 12/2003 | Logan | 707/3 |
| 6,665,666 B1 | 12/2003 | Brown et al. | 707/5 |
| 6,665,837 B1 | 12/2003 | Dean et al. | 715/501.1 |
| 6,675,159 B1 * | 1/2004 | Lin et al. | 1/1 |
| 6,684,205 B1 * | 1/2004 | Modha et al. | 1/1 |
| 6,693,651 B2 | 2/2004 | Biebesheimer et al. | 345/837 |
| 6,704,726 B1 | 3/2004 | Amouroux | 707/4 |
| 6,738,767 B1 | 5/2004 | Chung et al. | 707/7 |
| 6,745,189 B2 | 6/2004 | Schreiber | |
| 6,754,873 B1 | 6/2004 | Law et al. | 715/501.1 |
| 6,763,496 B1 * | 7/2004 | Hennings et al. | 715/205 |
| 6,799,176 B1 | 9/2004 | Page | 707/5 |
| 6,804,667 B1 | 10/2004 | Martin | 707/6 |
| 6,820,081 B1 | 11/2004 | Kawai et al. | |
| 6,820,093 B2 | 11/2004 | de la Huerga | |
| 6,823,495 B1 | 11/2004 | Vedula et al. | 715/805 |
| 6,832,218 B1 | 12/2004 | Emens et al. | 707/3 |
| 6,845,354 B1 | 1/2005 | Kuo et al. | 704/9 |
| 6,850,896 B1 | 2/2005 | Kelman et al. | 705/10 |
| 6,868,411 B2 | 3/2005 | Shanahan | |
| 6,873,982 B1 | 3/2005 | Bates et al. | 707/5 |
| 6,873,993 B2 * | 3/2005 | Charlesworth et al. | 707/740 |
| 6,886,005 B2 | 4/2005 | Davis | 707/2 |
| 6,886,010 B2 * | 4/2005 | Kostoff | 1/1 |
| 6,901,403 B1 | 5/2005 | Bata et al. | 707/101 |
| 6,904,429 B2 | 6/2005 | Sako et al. | 707/3 |
| 6,957,213 B1 | 10/2005 | Yuret | 707/4 |
| 6,963,880 B1 | 11/2005 | Pingte et al. | 707/103 |
| 6,965,900 B2 * | 11/2005 | Srinivasa et al. | 1/1 |
| 6,996,572 B1 * | 2/2006 | Chakrabarti et al. | 715/205 |
| 7,003,506 B1 | 2/2006 | Fisk et al. | 707/1 |
| 7,003,522 B1 | 2/2006 | Reynar et al. | 707/10 |
| 7,003,719 B1 | 2/2006 | Rosenoff et al. | 715/500.1 |
| 7,007,228 B1 | 2/2006 | Carro | 715/513 |
| 7,013,308 B1 | 3/2006 | Tunstall-Pedoe | 707/104.1 |
| 7,020,662 B2 | 3/2006 | Boreham et al. | 707/104.1 |
| 7,043,521 B2 | 5/2006 | Eitel | 709/202 |
| 7,051,023 B2 | 5/2006 | Kapur et al. | 707/5 |
| 7,076,491 B2 | 7/2006 | Tsao | 707/100 |
| 7,080,073 B1 * | 7/2006 | Jiang et al. | 1/1 |
| 7,080,085 B1 | 7/2006 | Choy et al. | 707/101 |
| 7,100,082 B2 * | 8/2006 | Little et al. | 714/26 |
| 7,143,099 B2 | 11/2006 | Leeheler-Moore et al. | 707/101 |
| 7,146,536 B2 * | 12/2006 | Bingham et al. | 714/26 |
| 7,158,980 B2 | 1/2007 | Shen | 707/100 |
| 7,162,499 B2 | 1/2007 | Lees et al. | 707/203 |
| 7,165,024 B2 * | 1/2007 | Glover et al. | 704/9 |
| 7,174,504 B2 | 2/2007 | Tsao | 715/503 |
| 7,181,471 B1 * | 2/2007 | Ibuki et al. | 1/1 |
| 7,194,380 B2 | 3/2007 | Barrow et al. | 702/181 |
| 7,197,449 B2 | 3/2007 | Hu et al. | |
| 7,216,073 B2 | 5/2007 | Lavi et al. | 704/9 |
| 7,233,943 B2 * | 6/2007 | Modha et al. | 1/1 |
| 7,260,573 B1 * | 8/2007 | Jeh et al. | 707/708 |
| 7,263,565 B2 * | 8/2007 | Tawara et al. | 710/110 |
| 7,269,587 B1 * | 9/2007 | Page | 1/1 |
| 7,277,879 B2 * | 10/2007 | Varadarajan | 707/1 |
| 7,302,646 B2 | 11/2007 | Nomiyama et al. | 715/764 |
| 7,305,380 B1 | 12/2007 | Hoelzle et al. | 707/3 |
| 7,325,160 B2 | 1/2008 | Tsao | 714/15 |
| 7,363,312 B2 | 4/2008 | Goldsack | 707/102 |
| 7,376,895 B2 | 5/2008 | Tsao | 715/517 |
| 7,398,461 B1 * | 7/2008 | Broder et al. | 715/208 |
| 7,409,381 B1 | 8/2008 | Steel et al. | 707/3 |
| 7,418,736 B2 * | 8/2008 | Ghanea-Hercock | 726/28 |
| 7,454,430 B1 * | 11/2008 | Komissarchik et al. | 1/1 |
| 7,472,182 B1 | 12/2008 | Young et al. | |
| 7,483,829 B2 | 1/2009 | Murakami et al. | |
| 7,493,308 B1 | 2/2009 | Bair, Jr. et al. | 707/3 |
| 7,493,317 B2 | 2/2009 | Geva | 707/3 |
| 7,587,387 B2 | 9/2009 | Hogue | 707/3 |
| 7,644,076 B1 * | 1/2010 | Ramesh et al. | 707/999.006 |
| 7,672,971 B2 | 3/2010 | Betz et al. | 707/103 |
| 7,685,201 B2 | 3/2010 | Zeng et al. | |
| 7,698,303 B2 | 4/2010 | Goodwin et al. | |
| 7,716,225 B1 * | 5/2010 | Dean et al. | 707/748 |
| 7,747,571 B2 | 6/2010 | Boggs | |
| 7,756,823 B2 | 7/2010 | Young et al. | |
| 7,797,282 B1 | 9/2010 | Kirshenbaum et al. | |
| 7,885,918 B2 | 2/2011 | Statchuk | |
| 7,917,154 B2 | 3/2011 | Fortescue et al. | |
| 7,953,720 B1 | 5/2011 | Rohde et al. | |
| 8,024,281 B2 * | 9/2011 | Proctor et al. | 706/47 |
| 8,065,290 B2 | 11/2011 | Hogue | |
| 8,108,501 B2 | 1/2012 | Birnie et al. | |
| 2001/0021935 A1 | 9/2001 | Mills | 707/513 |
| 2002/0022956 A1 | 2/2002 | Ukrainczyk et al. | |
| 2002/0038307 A1 | 3/2002 | Obradovic et al. | 707/102 |
| 2002/0042707 A1 | 4/2002 | Zhao et al. | 704/9 |
| 2002/0065845 A1 | 5/2002 | Naito et al. | 707/500.1 |
| 2002/0073115 A1 | 6/2002 | Davis | 707/500.1 |
| 2002/0083039 A1 | 6/2002 | Ferrari et al. | 707/1 |

(56) References Cited

U.S. PATENT DOCUMENTS

| | | |
|---|---|---|
| 2002/0087567 A1 | 7/2002 | Spiegler et al. ............... 707/100 |
| 2002/0107861 A1 | 8/2002 | Clendinning et al. ........ 707/101 |
| 2002/0147738 A1 | 10/2002 | Reader |
| 2002/0169770 A1* | 11/2002 | Kim et al. ......................... 707/5 |
| 2002/0174099 A1 | 11/2002 | Raj et al. ........................... 707/1 |
| 2002/0178448 A1 | 11/2002 | Te Kiefte et al. ............... 725/46 |
| 2002/0194172 A1 | 12/2002 | Schreiber ........................ 707/4 |
| 2003/0018652 A1 | 1/2003 | Heckerman et al. ........ 707/104.1 |
| 2003/0058706 A1 | 3/2003 | Okamoto et al. .............. 365/200 |
| 2003/0069880 A1 | 4/2003 | Harrison et al. ................. 707/3 |
| 2003/0078902 A1 | 4/2003 | Leong et al. .................... 706/59 |
| 2003/0088607 A1* | 5/2003 | Ruellan et al. ................ 709/102 |
| 2003/0097357 A1 | 5/2003 | Ferrari et al. .................... 707/3 |
| 2003/0120644 A1 | 6/2003 | Shirota |
| 2003/0120675 A1 | 6/2003 | Stauber et al. ............... 707/100 |
| 2003/0126102 A1 | 7/2003 | Borthwick |
| 2003/0126152 A1 | 7/2003 | Rajak ........................... 707/101 |
| 2003/0149567 A1* | 8/2003 | Schmitz et al. ............... 704/270 |
| 2003/0149699 A1 | 8/2003 | Tsao ............................. 707/100 |
| 2003/0154071 A1 | 8/2003 | Shreve |
| 2003/0167163 A1* | 9/2003 | Glover et al. .................... 704/9 |
| 2003/0177110 A1 | 9/2003 | Okamoto et al. ................. 707/3 |
| 2003/0182310 A1 | 9/2003 | Charnock et al. .......... 707/104.1 |
| 2003/0195872 A1 | 10/2003 | Senn ............................... 707/3 |
| 2003/0195877 A1 | 10/2003 | Ford et al. ........................ 707/3 |
| 2003/0196052 A1 | 10/2003 | Bolik et al. |
| 2003/0204481 A1* | 10/2003 | Lau ................................ 707/1 |
| 2003/0208354 A1 | 11/2003 | Lin et al. |
| 2004/0003067 A1 | 1/2004 | Ferrin ............................. 709/223 |
| 2004/0015481 A1* | 1/2004 | Zinda ............................... 707/1 |
| 2004/0024739 A1 | 2/2004 | Copperman et al. ............. 707/1 |
| 2004/0049503 A1* | 3/2004 | Modha et al. .................... 707/3 |
| 2004/0059726 A1 | 3/2004 | Hunter et al. ..................... 707/3 |
| 2004/0064447 A1 | 4/2004 | Simske et al. |
| 2004/0069880 A1 | 4/2004 | Samelson et al. ............... 241/74 |
| 2004/0088292 A1 | 5/2004 | Dettinger et al. ................ 707/4 |
| 2004/0107125 A1 | 6/2004 | Guheen et al. |
| 2004/0122844 A1 | 6/2004 | Malloy et al. ................. 707/102 |
| 2004/0122846 A1* | 6/2004 | Chess et al. ................... 707/102 |
| 2004/0123240 A1 | 6/2004 | Gerstl et al. ................... 715/513 |
| 2004/0128624 A1 | 7/2004 | Arellano et al. .............. 715/530 |
| 2004/0143600 A1 | 7/2004 | Musgrove et al. |
| 2004/0153456 A1 | 8/2004 | Charnock et al. ............. 707/10 |
| 2004/0167870 A1 | 8/2004 | Wakefield et al. ............. 707/1 |
| 2004/0167907 A1 | 8/2004 | Wakefield et al. |
| 2004/0167911 A1 | 8/2004 | Wakefield et al. |
| 2004/0177015 A1 | 9/2004 | Galai et al. ..................... 705/35 |
| 2004/0177080 A1 | 9/2004 | Doise et al. ................... 707/100 |
| 2004/0199923 A1 | 10/2004 | Russek ........................ 719/310 |
| 2004/0236655 A1* | 11/2004 | Scumniotales et al. ......... 705/36 |
| 2004/0243552 A1 | 12/2004 | Titemore et al. .................. 707/3 |
| 2004/0243614 A1* | 12/2004 | Boone et al. .................. 707/102 |
| 2004/0255237 A1 | 12/2004 | Tong ........................... 715/501.1 |
| 2004/0260979 A1 | 12/2004 | Kumai |
| 2004/0267700 A1 | 12/2004 | Dumais et al. |
| 2004/0268237 A1 | 12/2004 | Jones et al. .................... 715/513 |
| 2005/0055365 A1 | 3/2005 | Ramakrishnan et al. |
| 2005/0076012 A1 | 4/2005 | Manber et al. ................... 707/3 |
| 2005/0080613 A1 | 4/2005 | Colledge et al. |
| 2005/0086211 A1 | 4/2005 | Mayer |
| 2005/0086222 A1 | 4/2005 | Wang et al. ...................... 707/5 |
| 2005/0086251 A1* | 4/2005 | Hatscher et al. .............. 707/102 |
| 2005/0097150 A1 | 5/2005 | McKeon et al. |
| 2005/0108630 A1 | 5/2005 | Wasson et al. ................ 715/513 |
| 2005/0114324 A1* | 5/2005 | Mayer .............................. 707/3 |
| 2005/0125311 A1 | 6/2005 | Chidiac et al. ................. 705/28 |
| 2005/0138007 A1* | 6/2005 | Amitay ............................ 707/3 |
| 2005/0149576 A1* | 7/2005 | Marmaros et al. ........... 707/200 |
| 2005/0149851 A1* | 7/2005 | Mittal ......................... 715/501.1 |
| 2005/0159851 A1 | 7/2005 | Engstrom et al. ............... 701/1 |
| 2005/0165781 A1* | 7/2005 | Kraft et al. ........................ 707/7 |
| 2005/0187923 A1 | 8/2005 | Cipollone ........................ 707/3 |
| 2005/0188217 A1* | 8/2005 | Ghanea-Hercock .......... 713/200 |
| 2005/0240615 A1 | 10/2005 | Barness et al. ............... 707/102 |
| 2005/0256825 A1 | 11/2005 | Dettinger et al. ................. 707/1 |
| 2006/0036504 A1 | 2/2006 | Allocca et al. ................. 705/26 |
| 2006/0041597 A1 | 2/2006 | Conrad et al. |
| 2006/0047691 A1* | 3/2006 | Humphreys et al. .......... 707/102 |
| 2006/0047838 A1 | 3/2006 | Chauhan ....................... 709/230 |
| 2006/0053171 A1 | 3/2006 | Eldridge et al. |
| 2006/0053175 A1 | 3/2006 | Gardner et al. |
| 2006/0064411 A1 | 3/2006 | Gross et al. ........................ 707/3 |
| 2006/0074824 A1 | 4/2006 | Li ................................. 706/20 |
| 2006/0074910 A1* | 4/2006 | Yun et al. ......................... 707/7 |
| 2006/0085465 A1 | 4/2006 | Nori et al. ..................... 707/101 |
| 2006/0112110 A1 | 5/2006 | Maymir-Ducharme et al. ............................ 707/100 |
| 2006/0123046 A1 | 6/2006 | Doise et al. ................... 707/102 |
| 2006/0129843 A1 | 6/2006 | Srinivasa et al. |
| 2006/0136585 A1 | 6/2006 | Mayfield et al. |
| 2006/0143227 A1 | 6/2006 | Helm et al. |
| 2006/0143603 A1 | 6/2006 | Kalthoff et al. |
| 2006/0149800 A1* | 7/2006 | Egnor et al. .................. 707/205 |
| 2006/0152755 A1 | 7/2006 | Curtis et al. ................. 358/1.15 |
| 2006/0167991 A1 | 7/2006 | Heikes et al. |
| 2006/0224582 A1 | 10/2006 | Hogue ............................ 707/6 |
| 2006/0238919 A1 | 10/2006 | Bradley et al. |
| 2006/0242180 A1 | 10/2006 | Graf et al. ..................... 707/101 |
| 2006/0248045 A1 | 11/2006 | Toledano et al. |
| 2006/0248456 A1 | 11/2006 | Bender et al. ................ 715/531 |
| 2006/0253418 A1 | 11/2006 | Charnock et al. ............... 707/1 |
| 2006/0259462 A1 | 11/2006 | Timmons ......................... 707/3 |
| 2006/0277169 A1 | 12/2006 | Lunt et al. ........................ 707/3 |
| 2006/0288268 A1 | 12/2006 | Srinivasan et al. |
| 2006/0293879 A1 | 12/2006 | Zhao et al. ..................... 704/9 |
| 2007/0005593 A1 | 1/2007 | Self et al. ......................... 707/6 |
| 2007/0005639 A1 | 1/2007 | Gaussier et al. ............. 707/103 |
| 2007/0016890 A1 | 1/2007 | Brunner et al. .............. 717/107 |
| 2007/0038610 A1 | 2/2007 | Omoigui ......................... 707/3 |
| 2007/0043708 A1 | 2/2007 | Tunstall-Pedoe |
| 2007/0055656 A1 | 3/2007 | Tunstall-Pedoe ................ 707/3 |
| 2007/0073768 A1 | 3/2007 | Goradia ..................... 707/104.1 |
| 2007/0094246 A1 | 4/2007 | Dill et al. ......................... 707/4 |
| 2007/0100814 A1 | 5/2007 | Lee et al. |
| 2007/0130123 A1 | 6/2007 | Majumder ....................... 707/3 |
| 2007/0143282 A1 | 6/2007 | Betz et al. ........................ 707/5 |
| 2007/0143317 A1 | 6/2007 | Hogue et al. ................. 707/100 |
| 2007/0150800 A1 | 6/2007 | Betz et al. ..................... 715/500 |
| 2007/0198451 A1 | 8/2007 | Kehlenbeck et al. ........... 706/50 |
| 2007/0198480 A1 | 8/2007 | Hogue et al. .................... 707/3 |
| 2007/0198481 A1 | 8/2007 | Hogue et al. .................... 707/3 |
| 2007/0198503 A1 | 8/2007 | Hogue et al. .................... 707/5 |
| 2007/0198577 A1 | 8/2007 | Betz et al. ..................... 707/103 |
| 2007/0198598 A1 | 8/2007 | Betz et al. ..................... 707/201 |
| 2007/0198600 A1 | 8/2007 | Betz ............................. 707/201 |
| 2007/0203867 A1 | 8/2007 | Hogue et al. .................. 706/48 |
| 2007/0208773 A1 | 9/2007 | Tsao ............................. 707/103 |
| 2007/0271268 A1* | 11/2007 | Fontoura et al. ................ 707/6 |
| 2008/0071739 A1 | 3/2008 | Kumar et al. |
| 2008/0104019 A1 | 5/2008 | Nath |
| 2009/0006359 A1 | 1/2009 | Liao |
| 2009/0119255 A1 | 5/2009 | Frank et al. ...................... 707/3 |

FOREIGN PATENT DOCUMENTS

| | | | |
|---|---|---|---|
| JP | 2002-157276 | 5/2002 | |
| JP | 2002-540506 | 11/2002 | |
| JP | 2003-281173 | 10/2003 | |
| WO | WO 01/27713 | 4/2001 | |
| WO | WO 2004/114163 | 12/2004 | ............. G06F 17/30 |
| WO | WO 2006/104951 | 10/2006 | ............. G06F 17/30 |

OTHER PUBLICATIONS

Brin, S., et al., "The Anatomy of a Large-Scale Hypertextual Web Search Engine," 7th Int'l World Wide Web Conference, Brisbane, Australia, Apr. 14-18, 1998, pp. 1-26.

Bunescu, R., et al., "Using Encyclopedia Knowledge for Named Entity Disambiguation," Department of Computer Sciences, University of Texas, retrieved from internet Dec. 28, 2006, 8 pages.

Craswell, N., et al., "Effective Site Finding using Link Anchor Information," SIGIR '01, Sep. 9-12, 2001, pp. 250-257.

Dong, X., et al., "Reference Reconciliation in Complex Information Spaces," SIGACM-SIGMOD, 2005, 12 pages.

(56) References Cited

OTHER PUBLICATIONS

Downey, D., et al., "Learning Text Patterns for Web Information Extraction and Assessment," American Association for Artificial Intelligence, 2002, 6 pages.
Gray, R.M., "Entropy and Information Theory," Springer-Verlag, New York, NY, 1990, pp. 17-46.
Haveliwala, T.H., "Topic-Sensitive PageRank," Proceeding of the 11th Int'l World Wide Web Conference, Honolulu, Hawaii, May 7-11, 2002, pp. 1-23.
International Search Report and Written Opinion for International Application No. PCT/US2007/61156, mailed Feb. 11, 2008, 7 pages.
International Search Report and Written Opinion for International Application No. PCT/US2006/019807, mailed Dec. 18, 2006, 4 pages.
Jeh, G., et al., "Scaling Personalized Web Search," Proceedings of the 12th Int'l World Wide Web Conference, Budapest, Hungary, May 20-24, 2003, pp. 1-24.
Ji, H., et al., "Re-Ranking Algorithms for Name Tagging," Workshop on Computationally Hard Problems and Joint Inference in Speech and Language Processing, Jun. 2006, 8 pages.
Kolodner, J., "Indexing and Retrieval Strategies for Natural Language Fact Retrieval," ACM Trans. Database Syst. 8.3., Sep. 1983, 434-464.
MacKay, D.J.C., "Information Theory, Inference and Learning Algorithms," Cambridge University Press, 2003, pp. 22-33, 138-140.
Mann, G. et al., "Unsupervised Personal Name Disambiguation," Proceedings of the Seventy Conference on Natural Language Learning at HLT-NAACL, 2003, 8 pages.
Page, L., et al., "The PageRank Citation Ranking: Bringing Order to the Web," Stanford Digital Libraries Working Paper, 1998, pp. 1-17.
Pawson, D., "Sorting and Grouping," www.dpawson.co.uk/xsl/sect2/N6280.html>, Feb. 7, 2004, pp. 1-19.
Richardson, M., et al., "Beyond Page Rank: Machine Learning for Static Ranking," International World Wide Web Conference Committee, May 23, 2006, 9 pages.
Richardson, M., et al., "The Intelligent Surfer: Probabilistic Combination of Link and Content Information in PageRank," Advances in Neural Information Processing Systems, vol. 14, MIT Press, Cambridge, MA, 2002, 8 pages.
Rioloff, E., et al., "Learning Dictionaries for Information Extraction by Multi-Level Bootstrapping," American Association for Artificial Intelligence, 1999, 6 pages.
Shannon, C.E., et al., "A Mathematical Theory of Communication," The Bell System Technical Journal, vol. 27, July, Oct. 1949, pp. 1-55.
Sun Microsystems, "Attribute Names," http://java.sun.com/products/jndi/tutorial/basics/directory/attrnames.html>, Feb. 17, 2004, pp. 1-2.
Wang, Y., et al., "C4-2: Combining Link and Contents in Clustering Web Search to Improve Information Interpretation," The University of Tokyo, 2002, , pp. 1-9.
Brill, E. et al., "An Analysis of the AskMSR Question-Answering System," Proceedings of the Conference on Empirical Methods in Natural Language Processing (EMNLP), Jul. 2002, pp. 257-264.
Brin, S., "Extracting Patterns and Relations from the World Wide Web," 12 pages.
Chang, C. et al., "IEPAD: Information Extraction Based on Pattern Discovery," WWW10 '01, ACM, May 1-5, 2001, pp. 681-688.
Chu-Carroll, J. et al., "A Multi-Strategy with Multi-Source Approach to Question Answering," 8 pages.
Dean, J. et al., "MapReduce: Simplified Data Processing on Large Clusters," to appear in OSDI 2004, pp. 1-13.
Etzioni, I. et al., "Web-scale Information Extraction in KnowItAll (Preliminary Results)," WWW2004, ACM, May 17-20, 2004, 11 pages.
Freitag, D. et al., "Boosted Wrapper Induction," American Association for Artificial Intelligence, 2000, 7 pages.
Guha, R. et al., "Disambiguating People in Search," WWW2004, ACM, May 17-22, 2004, 9 pages.
Guha, R., "Object Co-identification on the Semantic Web," WWW2004, ACM, May 17-22, 2004, 9 pages.
Hogue, A.W., "Tree Pattern Inference and Matching for Wrapper Induction on the World Wide Web," Master of Engineering in Electrical Engineering and Computer Science, Massachusetts Institute of Technology, Jun. 2004, pp. 1-106.
"Information Entropy—Wikipedia, the free encyclopedia," [online] [Retrieved on May 3, 2006] Retrieved from the Internet<URL:http://en.wikipedia.org/wiki/Information_entropy>.
"Information Theory—Wikipedia, the free encyclopedia," [online] [Retrieved on May 3, 2006] Retrieved from the Internet<URL:http://en.wikipedia.org/wiki/Information_theory>.
Jones, R. et al., "Bootstrapping for Text Learning Tasks," 12 pages.
Kosseim, L, et al., "Answer Formulation for Question-Answering," 11 pages.
Liu, B. et al., "Mining Data Records in Web Pages," Conference '00, ACM, 2000, pp. 1-10.
McCallum, A. et al., "Object Consolodation by Graph Partitioning with a Conditionally-Trained Distance Metric," SIGKDD '03, ACM, Aug. 24-27, 2003, 6 pages.
Mihalcea, R. et al., "PageRank on Semantic Networks, with Application to Word Sense Disambiguation," 7 pages.
Mihalcea, R. et al., "TextRank: Bringing Order into Texts," 8 pages.
PCT International Search Report and Written Opinion, PCT/US06/07639, Sep. 13, 2006, 6 pages.
Prager, J. et al., "IBM's PIQUANT in TREC2003," 10 pages.
Prager, J. et al., "Question Answering using Constraint Satisfaction: QA-by-Dossier-with-Constraints," 8 pages.
Ramakrishnan, G. et al., "Is Question Answering an Acquired Skill?", WWW2004, ACM, May 17, 2004, pp. 111-120.
Andritsos, Information-Theoretic Tools for Mining Database Structure from Large Data Sets, ACM SIGMOD, Jun. 13-18, 2004, 12 pgs.
Chen, A Scheme for Inference Problems Using Rough Sets and Entropy, Lecture Notes in Computer Science, vol. 3642/2005, Regina, Canada, Aug. 31-Sep. 3, 2005, pp. 558-567.
Dean, Using Design Recovery Techniques to Transfolin Legacy Systems, Software Maintenance, Nov. 7-9, 2001, Proceedings, IEEE International Conference, 10 pgs.
Etzioni, Unsupervised Named-Entity Extraction from the Web: An Experimental Study, Dept. of Computer Science and Engineering, Univ. of Washington, Seattle, WA, Feb. 28, 2005, 42 pgs.
Google, Canadian Patent Application 2610208, Office Action, Sep. 21, 2011, 3 pgs.
Google, European Patent Application 06784449.8, Office Action, Mar. 26, 2012, 7 pgs.
Google, Japanese Patent Application 2008-504204, Office Action, Oct. 12, 2011, 4 pgs.
Koeller, Approximate Matching of Textual Domain Attributes for Information Source Integration, IQIS '05 Proceedings of the 2nd International Workshop on Information Source Integration, Jun. 17, 2005, 10 pgs.
Merriam Webster Dictionary defmes "normalize" as "to make conform to or reduce to a norm or standard", date: 1865, 2 pages.
Merriam Webster Dictionary defines "value" as "a numerical quantity that is assigned or is determined by calculation or measurement", date: 1300, 2 pages.
Microsoft Computer Dictionary defines "normalize" as "adjust number within specific range", May 1, 2002, 4 pages.
Microsoft Computer Dictionary Defines "quantity" as a "number", May 1, 2002, 4 pages.
Microsoft Computer Dictionary defines "value" as "a quantity", May 1, 2002, 4 pages.
Nadeau, Unsupervised named-Entity Recognition: Generating Gazetteers and Resolving Ambiguity, Inst. for Information Technology, National Research Council Canada, Gatineau and Ottawa, Canada, Aug. 1, 2006, 12 pgs.
Betz, Examiner's Answer, U.S. Appl. No. 11/097,688, Jul. 8, 2010, 18 pgs.
Betz, Examiner's Answer, U.S. Appl. No. 11/394,414, Jan. 24, 2011, 31 pgs.
Betz, Notice of Allowance, U.S. Appl. No. 11/142,740, Apr. 16, 2009, 7 pgs.
Betz, Notice of Allowance, U.S. Appl. No. 11/142,765, Jul. 1, 2010, 14 pgs.

(56) References Cited

OTHER PUBLICATIONS

Betz, Notice of Allowance, U.S. Appl. No. 11/341,069, Sep. 8, 2008, 6 pgs.
Betz, Notice of Allowance, U.S. Appl. No. 12/939,981, Aug. 11, 2011, 7 pgs.
Betz, Notice of Allowance, U.S. Appl. No. 12/939,981, Apr. 26, 2011, 11 pgs.
Betz, Office Action, U.S. Appl. No. 11/142,740, Aug. 13, 2007, 12 pgs.
Betz, Office Action, U.S. Appl. No. 11/142,740, May 17, 2007, 12 pgs.
Betz, Office Action, U.S. Appl. No. 11/142,740, Jul. 23, 2008, 11 pgs.
Betz, Office Action, U.S. Appl. No. 11/142,740, Dec. 26, 2007, 12 pgs.
Betz, Office Action, U.S. Appl. No. 11/142,740, Jan. 27, 2009, 11 pgs.
Betz, Office Action, U.S. Appl. No. 11/142,740, Apr. 30, 2008, 14 pgs.
Betz, Office Action, U.S. Appl. No. 11/097,688, Mar. 18, 2009, 13 pgs.
Betz, Office Action, U.S. Appl. No. 11/097,688, Oct. 29, 2009, 11 pgs.
Betz, Office Action, U.S. Appl. No. 11/142,765, Jan. 8, 2010, 17 pgs.
Betz, Office Action, U.S. Appl. No. 11/142,765, May 9, 2008, 20 pgs.
Betz, Office Action, U.S. Appl. No. 11/142,765, Jan. 17, 2008, 16 pgs.
Betz, Office Action, U.S. Appl. No. 11/142,765, Oct. 17, 2007, 14 pgs.
Betz, Office Action, U.S. Appl. No. 11/142,765, Oct. 17, 2008, 17 pgs.
Betz, Office Action, U.S. Appl. No. 11/142,765, Jun. 18, 2007, 13 pgs.
Betz, Office Action, U.S. Appl. No. 11/142,765, Apr. 28, 2009, 16 pgs.
Betz, Office Action, U.S. Appl. No. 11/341,069, Apr. 1, 2008, 8 pgs.
Betz, Office Action, U.S. Appl. No. 11/394,414, Mar. 5, 2010, 24 pgs.
Betz, Office Action, U.S. Appl. No. 11/394,414, Sep. 15, 2009, 16 pgs.
Betz, Office Action, U.S. Appl. No. 12/939,981, Dec. 9, 2010, 12 pgs.
Betz, Office Action, U.S. Appl. No. 13/302,755, Mar. 25, 2012, 15 pgs.
Google Inc., Office Action, CA 2603085, Sep. 18, 2012, 2 pgs.
Hogue, Examiner's Answer, U.S. Appl. No. 11/142,748, Oct. 3, 2011, 23 pgs.
Hogue, Notice of Allowance, U.S. Appl. No. 11/097,689, Apr. 30, 2009, 8 pgs.
Hogue, Notice of Allowance, U.S. Appl. No. 11/356,837, Jan. 6, 2012, 12 pgs.
Hogue, Notice of Allowance, U.S. Appl. No. 11/356,837, Apr. 27, 2012, 7 pgs.
Hogue, Notice of Allowance, U.S. Appl. No. 12/546,578, Jan. 6, 2011, 8 pgs.
Hogue, Notice of Allowance, U.S. Appl. No. 12/546,578, Jul. 12, 2011, 10 pgs.
Hogue, Notice of Allowance, U.S. Appl. No. 13/206,457, Mar. 14, 2012, 9 pgs.
Hogue, Office Action, U.S. Appl. No. 11/097,689, Oct. 3, 2008, 13 pgs.
Hogue, Office Action, U.S. Appl. No. 11/097,689, Apr. 9, 2008, 11 pgs.
Hogue, Office Action, U.S. Appl. No. 11/097,689, Jun. 21, 2007, 9 pgs.
Hogue, Office Action, U.S. Appl. No. 11/097,689, Nov. 27, 2007, 10 pgs.
Hogue, Office Action, U.S. Appl. No. 11/142,748, Dec. 7, 2007, 13 pgs.
Hogue, Office Action, U.S. Appl. No. 11/142,748, Jul. 13, 2010, 12 pgs.
Howe, Office Action, U.S. Appl. No. 11/142,748, Aug. 17, 2009, 14 pgs.
Hogue, Office Action, U.S. Appl. No. 11/142,748, Nov. 17, 2010, 14 pgs.
Hogue, Office Action, U.S. Appl. No. 11/142,748, May 18, 2007, 9 pgs.
Hogue, Office Action, U.S. Appl. No. 11/142,748, Jul. 22, 2008, 18 pgs.
Hogue, Office Action, U.S. Appl. No. 11/142,748, Aug. 23, 2007, 13 pgs.
Hogue, Office Action, U.S. Appl. No. 11/142,748, Jan. 27, 2009, 17 pgs.
Hogue, Office Action, U.S. Appl. No. 11/356,837, Jun. 3, 2011, 18 pgs.
Hogue, Office Action, U.S. Appl. No. 11/356,837, Aug. 4, 2010, 20 pgs.
Hogue, Office Action, U.S. Appl. No. 11/356,837, Feb. 8, 2011, 14 pgs.
Hogue, Office Action, U.S. Appl. No. 11/356,837, May 11, 2009, 18 pgs.
Hogue, Office Action, U.S. Appl. No. 11/356,837, Feb. 19, 2010, 20 pgs.
Hogue, Office Action, U.S. Appl. No. 11/356,837, Mar. 21, 2008, 15 pgs.
Hogue, Office Action, U.S. Appl. No. 11/356,837, Oct. 27, 2009, 20 pgs.
Hogue, Office Action, U.S. Appl. No. 11/356,837, Sep. 30, 2008, 20 pgs.
Hogue, Office Action, U.S. Appl. No. 11/399,857, Mar. 1, 2012, 25 pgs.
Hogue, Office Action, U.S. Appl. No. 11/399,857, Mar. 3, 2011, 15 pgs.
Hogue, Office Action, U.S. Appl. No. 11/399,857, Jan. 5, 2009, 21 pgs.
Hogue, Office Action, U.S. Appl. No. 11/399,857, Jun. 8, 2009, 14 pgs.
Hogue, Office Action, U.S. Appl. No. 11/399,857, Sep. 13, 2010, 13 pgs.
Hogue, Office Action, U.S. Appl. No. 11/399,857, Jun. 24, 2011, 14 pgs.
Hogue, Office Action, U.S. Appl. No. 11/399,857, Dec. 28, 2009, 11 pgs.
Hogue, Office Action, U.S. Appl. No. 11/399,857, Mar. 31, 2008, 23 pgs.
Hogue, Office Action, U.S. Appl. No. 12/546,578, Aug. 4, 2010, 10 pgs.
Hogue, Office Action, U.S. Appl. No. 13/206,457, Oct. 28, 2011, 6 pgs.
Hogue, Office Action, U.S. Appl. No. 13/549,361, Oct. 4, 2012, 18 pgs.
Hogue, Office Action, U.S. Appl. No. 13/549,361, Mar. 6, 2013, 13 sgs.
Hogue, Office Action, U.S. Appl. No. 13/603,354, Jan. 9, 2013, 5 pgs.
Laroco, Notice of Allowance, U.S. Appl. No. 11/551,657, May 13, 2011, 8 pgs.
Laroco, Notice of Allowance, U.S. Appl. No. 11/551,657, Sep. 28, 2011, 8 pgs.
Laroco, Office Action, U.S. Appl. No. 11/551,657, Aug. 1, 2008, 15 pgs.
Laroco, Office Action, U.S. Appl. No. 11/551,657, Aug. 13, 2009, 16 pgs.
Laroco, Office Action, U.S. Appl. No. 11/551,657, Nov. 17, 2010, 20 pgs.
Laroco, Office Action, U.S. Appl. No. 11/551,657, Feb. 24, 2010, 17 pgs.
Laroco, Office Action, U.S. Appl. No. 11/551,657, Jan. 28, 2009, 17 pgs.
Laroco, Office Action, U.S. Appl. No. 13/364,244, Jan. 30, 2013, 8 pgs.
Rohde, Notice of Allowance, U.S. Appl. No. 11/097,690, Dec. 23, 2010, 8 pgs.
Rohde, Office Action, U.S. Appl. No. 11/097,690, May 1, 2008, 21 pgs.
Rohde, Office Action, U.S. Appl. No. 11/097,690, Jun. 9, 2010, 11 pgs.

(56) References Cited

OTHER PUBLICATIONS

Rohde, Office Action, U.S. Appl. No. 11/097,690, Oct. 15, 2008, 22 pgs.
Rohde, Office Action, U.S. Appl. No. 11/097,690, Aug. 27, 2009, 13 pgs.
Rohde, Office Action, U.S. Appl. No. 11/097,690, Apr. 28, 2009, 9 pgs.
Rohde, Office Action, U.S. Appl. No. 11/097,690, Sep. 28, 2007, 17 pgs.
Shamsi, Notice of Allowance, U.S. Appl. No. 11/781,891, Oct. 25, 2010, 7 pgs.
Shamsi, Notice of Allowance, U.S. Appl. No. 11/781,891, May 27, 2010, 6 pgs.
Shamsi, Office Action, U.S. Appl. No. 11/781,891, Nov. 16, 2009, 10 pgs.
Shamsi, Office Action, U.S. Appl. No. 13/171,296, Apr. 3, 2013, 7 pgs.
Vespe, Notice of Allowance, U.S. Appl. No. 11/686,217, Aug. 27, 2012, 11 pgs.
Vespe, Notice of Allowance, U.S. Appl. No. 11/745,605, Jun. 13, 2011, 9 pgs.
Vespe, Notice of Allowance, U.S. Appl. No. 11/745,605, Sep. 22, 2011, 9 pgs.
Vespe, Notice of Allowance, U.S. Appl. No. 11/745,605, Mar. 28, 2012, 10 pgs.
Vespe, Office Action, U.S. Appl. No. 11/686,217, Sep. 10, 2010, 14 pgs.
Vespe, Office Action, U.S. Appl. No. 11/686,217, Jan. 26, 2012, 12 pgs.
Vespe, Office Action, U.S. Appl. No. 11/686,217, Mar. 26, 2010, 13 pgs.
Vespe, Office Action, U.S. Appl. No. 11/745,605, Apr. 8, 2010, 15 pgs.
Vespe, Office Action, U.S. Appl. No. 11/745,605, Jul. 30, 2009, 17 pgs.
Zhao, Notice of Allowance, U.S. Appl. No. 11/394,610, May 11, 2009, 15 pgs.
Zhao, Office Action, U.S. Appl. No. 11/142,853, Oct. 2, 2009, 10 pgs.
Zhao, Office Action, U.S. Appl. No. 11/142,853, Sep. 5, 2008, 9 pgs.
Zhao, Office Action, U.S. Appl. No. 11/142,853, Mar. 17, 2009, 9 pgs.
Zhao, Office Action, U.S. Appl. No. 11/142,853, Jan. 25, 2008, 7 pgs.
Zhao, Office Action, U.S. Appl. No. 11/394,610, Apr. 1, 2008, 18 pgs.
Zhao, Office Action, U.S. Appl. No. 11/394,610, Nov. 13, 2008, 18 pgs.
Zhao, Office Action, U.S. Appl. No. 11/941,382, Sep. 8, 2011, 28 pgs.
Zhao, Office Action, U.S. Appl. No. 11/941,382, Aug. 12, 2010, 23 pgs.
Zhao, Office Action, U.S. Appl. No. 11/941,382, May 24, 2012, 26 pgs.
Zhao, Office Action, U.S. Appl. No. 11/941,382, Nov. 26, 2012, 24 pgs.
Zhao, Office Action, U.S. Appl. No. 11/941,382, Jan. 27, 2011, 24 pgs.
Zhao, Office Action, U.S. Appl. No. 11/941,382, Dec. 29, 2009, 25 pgs.
Betz, Notice of Allowance, U.S. Appl. No. 11/097,688, Nov. 19, 2013, 17 pgs.
Betz, Notice of Allowance, U.S. Appl. No. 13/302,755, Jan. 6, 2014, 9 pgs.
Betz, Notice of Allowance, U.S. Appl. No. 13/302,755, Aug. 28, 2013, 6 pgs.
Hogue, Notice of Allowance, U.S. Appl. No. 13/549,361, Oct. 2, 2013, 9 pgs.
Hogue, Notice of Allowance, U.S. Appl. No. 13/549,361, Jun. 26, 2013, 8 pgs.
Hogue, Notice of Allowance, U.S. Appl. No. 13/603,354, Nov. 12, 2013, 9 pgs.
Hogue, Notice of Allowance, U.S. Appl. No. 13/603,354, Jun. 26, 2013, 8 pgs.
Laroco, Notice of Allowance, U.S. Appl. No. 13/364,244, Aug. 6, 2013, 6 pgs.
Laroco, Notice of Allowance, U.S. Appl. No. 13/364,244, Feb. 7, 2014, 5 pgs.
Laroco, Office Action, U.S. Appl. No. 13/364,244, Dec. 19, 2013, 5 pgs.
Shamsi, Final Office Action, U.S. Appl. No. 13/171,296, Nov. 4, 2013, 29 pgs.
Zhao, Office Action, U.S. Appl. No. 11/941,382, Sep. 27, 2013, 30 pgs.
Betz, Notice of Allowance, U.S. Appl. No. 11/394,414, Apr. 30, 2014, 12 pgs.
Zhao, Notice of Allowance, U.S. Appl. No. 11/941,382, Apr. 14, 2014, 5 pgs.
Cover, T.M., et al., "Elements of Information Theory," Wiley-InterScience, New York, NY, 1991, pp. 12-23.
Gao, X., et al., "Learning Information Extraction Patterns from Tabular Web Pages Without Manual Labelling," Proceedings of IEEE/WIC Int'l Conf. on Web Intelligence (WI'03), Oct. 13-17, 2003, pp. 495-498.
Gigablast, Web/Directory, http://www.gigablast.com/?c=dmoz3, printed Aug. 24, 2010, 1 page.
Gilster, P., "Get Fast Answers, Easily," The News Observer, May 14, 2003, 2 pages.
Hsu, C. et al., "Finite-State Transducers for Semi-Structured Text Mining," IJCAI-99 Workshop on Text Mining: Foundations, Techniques and Applications, 1999, 12 pages.
Iiyas, I. et al., "Rank-aware Query Optimization," SIGMOD 2004, Jun. 13-18, 2004, 12 pages.
International Search Report and Written Opinion for International Application No. PCT/US2006/010965, mailed Jul. 5, 2006, 4 pages.
Kosala, R., et al, "Web Mining Research: A Survey," SIGKDD Explorations, vol. 2, Issue 1, p. 1, Jul. 2000, 15 pages.
Lin, J. et al., Question Answering from the Web Using Knowledge Annotation and Knowledge Mining Techniques, CIKM '03, Nov. 3-8, 2003, 8 pages.
Nyberg, E. et al., "The Javelin Question-Answering System at TREC 2003: A Multi-Strategy Approach with Dynamic Planning," TREC 2003, 9 pages.
Ogden, W. et al., "Improving Cross-Language Text Retrieval with Human Interactions," Proceedings of the 33rd Hawaii International Conference on System Sciences, IEEE 2000, 9 pages.
Plaisant, C. et al. "Interface and Data Architecture for Query Preview in Networked Information Systems," ACM Transaction on Information Systems, vol. 17, Issue 3, Jul. 1999, 18 pages.
Wirzenius, Lars, "C Preprocessor Trick for Implementing Similar Data Types," Jan. 17, 2000, pp. 1-9.
Zhao, S. et al., "Corroborate and Learn Facts from the Web," KDD'07, Aug. 12-15, 2007, 9 pages.

\* cited by examiner

Example Format of Facts in Repository (each fact is associated with an object ID)

Example Facts in Repository (each fact is associated with an object ID)

Example Object
Reference Table

Example Format of Facts in
Repository (each fact is associated
with an object ID)

Example Objects

Role of Corroboration Janitor

Method of Corroboration Janitor

Method of Anchor Text Selection

Example of Anchor Text Selection

Method of Determining if
Document Contains Valid Data

ANCHOR TEXT SUMMARIZATION FOR CORROBORATION

RELATED APPLICATIONS

This application is a continuation-in-part of U.S. application Ser. No. 11/097,688, entitled, "Corroborating Facts Extracted from Multiple Sources", by Jonathan T. Betz, filed on Mar. 31, 2005 now U.S. Pat. No. 8,682,913, which is hereby incorporated by reference.

This application is related to the following applications, all of which are hereby incorporated by reference:

U.S. application Ser. No. 11/142,765, entitled, "Identifying the Unifying Subject of a Set of Facts", by Jonathan Betz, filed on May 31, 2005;

U.S. application Ser. No. 11/366,162, entitled "Generating Structured Information," filed Mar. 1, 2006, by Egon Pasztor and Daniel Egnor;

U.S. application Ser. No. 11/357,748, entitled "Support for Object Search", filed Feb. 17, 2006, by Alex Kehlenbeck, Andrew W. Hogue;

U.S. application Ser. No. 11/342,290, entitled "Data Object Visualization", filed on Jan. 27, 2006, by Andrew W. Hogue, David Vespe, Alex Kehlenbeck, Mike Gordon, Jeffrey C. Reynar, David Alpert;

U.S. application Ser. No. 11/342,293, entitled "Data Object Visualization Using Maps", filed on Jan. 27, 2006, by Andrew W. Hogue, David Vespe, Alex Kehlenbeck, Mike Gordon, Jeffrey C. Reynar, David Alpert;

U.S. application Ser. No. 11/356,679, entitled "Query Language", filed Feb. 17, 2006, by Andrew W. Hogue, Doug Rohde;

U.S. application Ser. No. 11/356,837, entitled "Automatic Object Reference Identification and Linking in a Browseable Fact Repository", filed Feb. 17, 2006, by Andrew W. Hogue;

U.S. application Ser. No. 11/356,851, entitled "Browseable Fact Repository", filed Feb. 17, 2006, by Andrew W. Hogue, Jonathan T. Betz;

U.S. application Ser. No. 11/356,842, entitled "ID Persistence Through Normalization", filed Feb. 17, 2006, by Jonathan T. Betz, Andrew W. Hogue;

U.S. application Ser. No. 11/356,728, entitled "Annotation Framework", filed Feb. 17, 2006, by Tom Richford, Jonathan T. Betz;

U.S. application Ser. No. 11/341,069, entitled "Object Categorization for Information Extraction", filed on Jan. 27, 2006, by Jonathan T. Betz;

U.S. application Ser. No. 11/356,838, entitled "Modular Architecture for Entity Normalization", filed Feb. 17, 2006, by Jonathan T. Betz, Farhan Shamsi;

U.S. application Ser. No. 11/356,765, entitled "Attribute Entropy as a Signal in Object Normalization", filed Feb. 17, 2006, by Jonathan T. Betz, Vivek Menezes;

U.S. application Ser. No. 11/341,907, entitled "Designating Data Objects for Analysis", filed on Jan. 27, 2006, by Andrew W. Hogue, David Vespe, Alex Kehlenbeck, Mike Gordon, Jeffrey C. Reynar, David Alpert;

U.S. application Ser. No. 11/342,277, entitled "Data Object Visualization Using Graphs", filed on Jan. 27, 2006, by Andrew W. Hogue, David Vespe, Alex Kehlenbeck, Mike Gordon, Jeffrey C. Reynar, David Alpert;

U.S. application Ser. No. 11/394,508 entitled "Entity Normalization Via Name Normalization", filed on Mar. 31, 2006, by Jonathan T. Betz;

U.S. application Ser. No. 11/394,610 entitled "Determining Document Subject by Using Title and Anchor Text of Related Documents", filed on Mar. 31, 2006, by Shubin Zhao;

U.S. application Ser. No. 11/394,414 entitled "Unsupervised Extraction of Facts", filed on Mar. 31, 2006, by Jonathan T. Betz and Shubin Zhao;

TECHNICAL FIELD

The disclosed embodiments relate generally to fact databases. More particularly, the disclosed embodiments relate to corroboration of facts extracted from multiple sources.

BACKGROUND

When information is collected from potentially contradictory, ambiguous, or untrustworthy sources, it is useful to have a mechanism for comparing information from multiple documents to ensure the accuracy of the collected information. Comparing information collected from multiple sources allows errant or ambiguous information to be detected and removed, and for the confidence in affirmed information to be consequently increased.

In order to perform comparisons of information collected from multiple sources, it is necessary to identity independent sources that are relevant to each other. For the comparison of information from different sources to be meaningful, the independent sources should be related to the same topic.

What is needed is a method for finding sources relevant to a topic so that information related to that topic can be reliably confirmed or rejected

SUMMARY

The invention is a system and method for corroborating a set of facts. If the anchor text of the references to a document matches the name of a set of facts, the referenced document is used to corroborate the set of facts. By analyzing the anchor text of the references to the document, the system is capable of determining if a document is relevant to the set of facts. The document can then be used to corroborate or refute the facts, thereby improving their overall quality.

DESCRIPTION OF EMBODIMENTS

Embodiments of the present invention are now described with reference to the figures where like reference numbers indicate identical or functionally similar elements.

Figure 1:
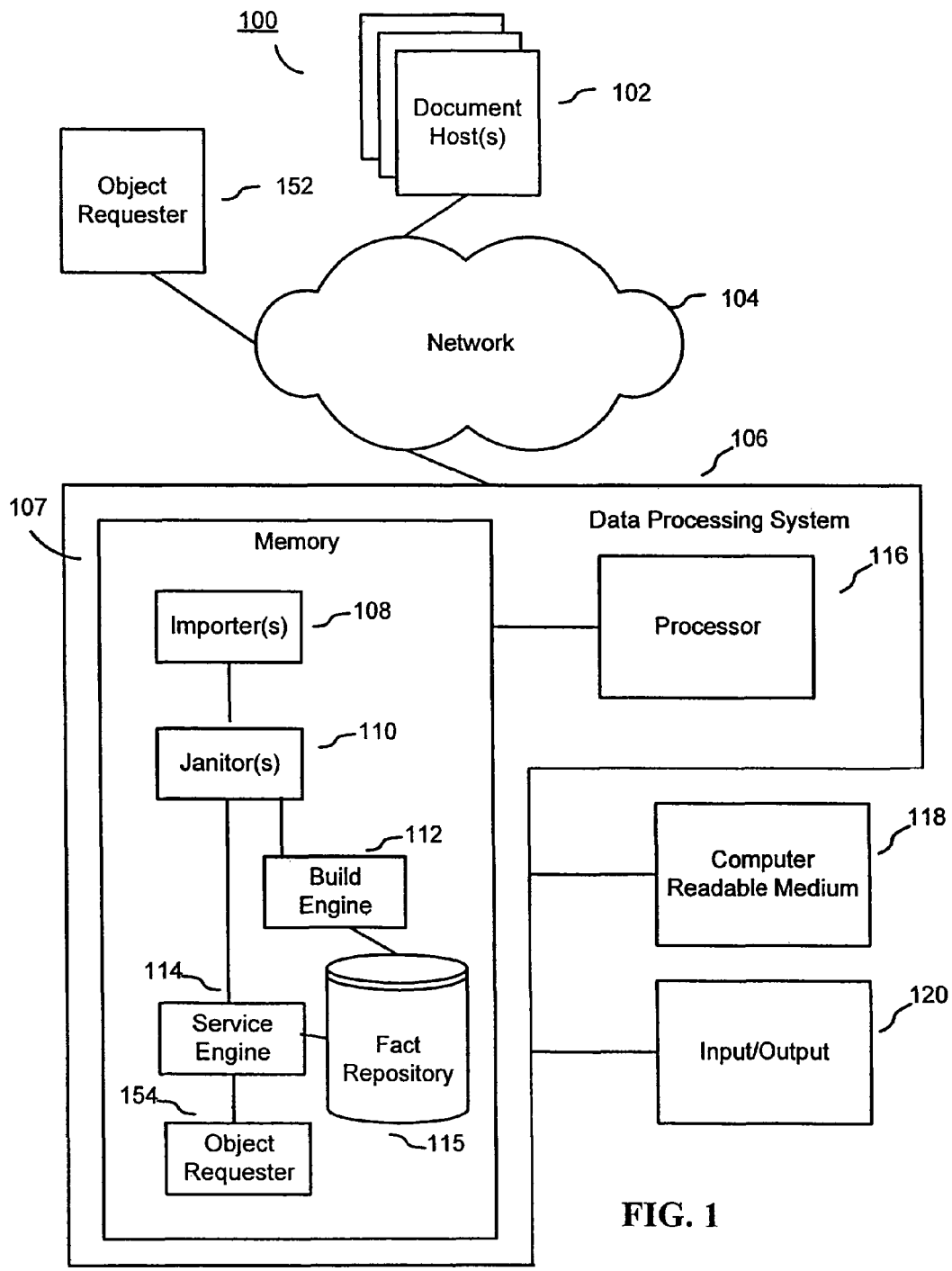
FIG. 1 shows a network, in accordance with a preferred embodiment of the invention.

FIG. 1 shows a system architecture 100 adapted to support one embodiment of the invention. FIG. 1 shows components used to add facts into, and retrieve facts from a repository 115. The system architecture 100 includes a network 104, through which any number of document hosts 102 communicate with a data processing system 106, along with any number of object requesters 152, 154.

Document hosts 102 store documents and provide access to documents. A document is comprised of any machine-readable data including any combination of text, graphics, multimedia content, etc. A document may be encoded in a markup language, such as Hypertext Markup Language (HTML), i.e., a web page, in a interpreted language (e.g., JavaScript) or in any other computer readable or executable format. A document can include one or more hyperlinks to other documents. A typical document will include one or more facts within its content. A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, Java). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. Data processing system 106 includes one or more importers 108, one or more janitors 110, a build engine 112, a service engine 114, and a fact repository 115 (also called simply a "repository"). Each of the foregoing are implemented, in one embodiment, as software modules (or programs) executed by processor 116. Importers 108 operate to process documents received from the document hosts, read the data content of documents, and extract facts (as operationally and programmatically defined within the data processing system 106) from such documents. The importers 108 also determine the subject or subjects with which the facts are associated, and extract such facts into individual items of data, for storage in the fact repository 115. In one embodiment, there are different types of importers 108 for different types of documents, for example, dependent on the format or document type.

Janitors 110 operate to process facts extracted by importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from repository 115, such as facts related to pornographic content. Other types of janitors 110 may be implemented, depending on the types of data management functions desired, such as translation, compression, spelling or grammar correction, and the like.

Various janitors 110 act on facts to normalize attribute names, and values and delete duplicate and near-duplicate facts so an object does not have redundant information. For example, we might find on one page that Britney Spears' birthday is "12/2/1981" while on another page that her date of birth is "Dec. 2, 1981." Birthday and Date of Birth might both be rewritten as Birthdate by one janitor and then another janitor might notice that 12/2/1981 and Dec. 2, 1981 are different forms of the same date. It would choose the preferred form, remove the other fact and combine the source lists for the two facts. As a result when you look at the source pages for this fact, on some you'll find an exact match of the fact and on others text that is considered to be synonymous with the fact.

Build engine 112 builds and manages the repository 115. Service engine 114 is an interface for querying the repository 115. Service engine 114's main function is to process queries, score matching objects, and return them to the caller but it is also used by janitor 110.

Repository 115 stores factual information extracted from a plurality of documents that are located on document hosts 102. A document from which a particular fact may be extracted is a source document (or "source") of that particular fact. In other words, a source of a fact includes that fact (or a synonymous fact) within its contents.

Repository 115 contains one or more facts. In one embodiment, each fact is associated with exactly one object. One implementation for this association includes in each fact an object ID that uniquely identifies the object of the association. In this manner, any number of facts may be associated with an individual object, by including the object ID for that object in the facts. In one embodiment, objects themselves are not physically stored in the repository 115, but rather are defined by the set or group of facts with the same associated object ID, as described below. Further details about facts in repository 115 are described below, in relation to FIGS. 2(a)-2(d).

It should be appreciated that in practice at least some of the components of the data processing system 106 will be distributed over multiple computers, communicating over a network. For example, repository 115 may be deployed over multiple servers. As another example, the janitors 110 may be located on any number of different computers. For convenience of explanation, however, the components of the data processing system 106 are discussed as though they were implemented on a single computer.

In another embodiment, some or all of document hosts 102 are located on data processing system 106 instead of being coupled to data processing system 106 by a network. For example, importer 108 may import facts from a database that is a part of or associated with data processing system 106.

FIG. 1 also includes components to access repository 115 on behalf of one or more object requesters 152, 154. Object requesters are entities that request objects from repository 115. Object requesters 152, 154 may be understood as clients of the system 106, and can be implemented in any computer device or architecture. As shown in FIG. 1, a first object requester 152 is located remotely from system 106, while a second object requester 154 is located in data processing system 106. For example, in a computer system hosting a blog, the blog may include a reference to an object whose facts are in repository 115. An object requester 152, such as a browser displaying the blog will access data processing system 106 so that the information of the facts associated with the object can be displayed as part of the blog web page. As a second example, janitor 110 or other entity considered to be part of data processing system 106 can function as object requester 154, requesting the facts of objects from repository 115.

FIG. 1 shows that data processing system 106 includes a memory 107 and one or more processors 116. Memory 107 includes importers 108, janitors 110, build engine 112, service engine 114, and requester 154, each of which are preferably implemented as instructions stored in memory 107 and executable by processor 116. Memory 107 also includes repository 115. Repository 115 can be stored in a memory of one or more computer systems or in a type of memory such as a disk. FIG. 1 also includes a computer readable medium 118 containing, for example, at least one of importers 108, janitors 110, build engine 112, service engine 114, requester 154, and at least some portions of repository 115. FIG. 1 also includes one or more input/output devices 120 that allow data to be input and output to and from data processing system 106. It will be understood that data processing system 106 preferably also includes standard software components such as operating systems and the like and further preferably includes standard hardware components not shown in the figure for clarity of example.

FIG. 2(*a*) shows an example format of a data structure for facts within repository 115, according to some embodiments of the invention. As described above, the repository 115 includes facts 204. Each fact 204 includes a unique identifier for that fact, such as a fact ID 210. Each fact 204 includes at least an attribute 212 and a value 214. For example, a fact associated with an object representing George Washington may include an attribute of "date of birth" and a value of "Feb. 22, 1732." In one embodiment, all facts are stored as alphanumeric characters since they are extracted from web pages. In another embodiment, facts also can store binary data values. Other embodiments, however, may store fact values as mixed types, or in encoded formats.

As described above, each fact is associated with an object ID 209 that identifies the object that the fact describes. Thus, each fact that is associated with a same entity (such as George Washington), will have the same object ID 209. In one embodiment, objects are not stored as separate data entities in memory. In this embodiment, the facts associated with an object contain the same object ID, but no physical object exists. In another embodiment, objects are stored as data entities in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

FIG. 2(*b*) shows an example of facts having respective fact IDs of 10, 20, and 30 in repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of "Bill Clinton was the 42nd President of the United States from 1993 to 2001." Thus, the object identified by object ID "2" has a property fact with a fact ID of 30 and a value of "Bill Clinton was the 42nd President of the United States from 1993 to 2001." In the illustrated embodiment, each fact has one attribute and one value. The number of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, numbers, perhaps even tables of figures. This content can be formatted, for example, in a markup language. For example, a fact having an attribute "original html" might have a value of the original html text taken from the source web page.

Also, while the illustration of FIG. 2(*b*) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

FIG. 2(*c*) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository to find all facts with a particular object ID. While FIGS. 2(*b*) and 2(*c*) illustrate the object reference table 210 with explicit coding of object and fact IDs, the table also may contain just the ID values themselves in column or pair-wise arrangements.

FIG. 2(*d*) shows an example of a data structure for facts within repository 115, according to some embodiments of the invention showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object "United States," there may be a fact with the attribute of "president" and the value of "George W. Bush," with "George W. Bush" being an object having its own facts in repository 115. In some embodiments, the value field 214 stores the name of the linked object and the link 216 stores the object identifier of the linked object. Thus, this "president" fact would include the value 214 of "George W. Bush", and object reference link 216 that contains the object ID for the for "George W. Bush" object. In some other embodiments, facts 204 do not include a link field 216 because the value 214 of a fact 204 may store a link to another object.

Each fact 204 also may include one or more metrics 218. A metric provides an indication of the some quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of one or more sources 220 that include the fact and from which the fact was extracted. Each source may be identified by a Uniform Resource Locator (URL), or Web address, or any other appropriate form of identification and/or location, such as a unique document identifier.

The facts illustrated in FIG. 2(*d*) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity or concept represented by the object ID. A name fact 207 includes an attribute 224 of "name" and a value, which is the name of the object. For example, for an object representing the country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object ID may have one or more associated name facts, as many entities or concepts can have more than one name. For example, an object ID representing Spain may have associated name facts conveying the country's common name "Spain" and the official name "Kingdom of Spain." As another example, an object ID representing the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly.

A property fact 208 is a fact that conveys a statement about the entity or concept represented by the object ID. Property facts are generally used for summary information about an object. A property fact 208, being a special instance of a general fact 204, also includes the same parameters (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object ID representing Bill Clinton, the value of a property fact may be the text string "Bill Clinton was the 42nd President of the United States from 1993 to 2001." Some object IDs may have one or more associated property facts while other objects may have no associated property facts. It should be appreciated that the data structures shown in FIGS. 2(a)-2(d) and described above are merely exemplary. The data structure of the repository 115 may take on other forms. Other fields may be included in facts and some of the fields described above may be omitted. Additionally, each object ID may have additional special facts aside from name facts and property facts, such as facts conveying a type or category (for example, person, place, movie, actor, organization, etc.) for categorizing the entity or concept represented by the object ID. In some embodiments, an object's name(s) and/or properties may be represented by special records that have a different format than the general facts records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance to a negative value). However, the facts of the null object are treated as if they were removed from the repository 115. In some other embodiments, facts of null objects are physically removed from repository 115.

Figure 2A:
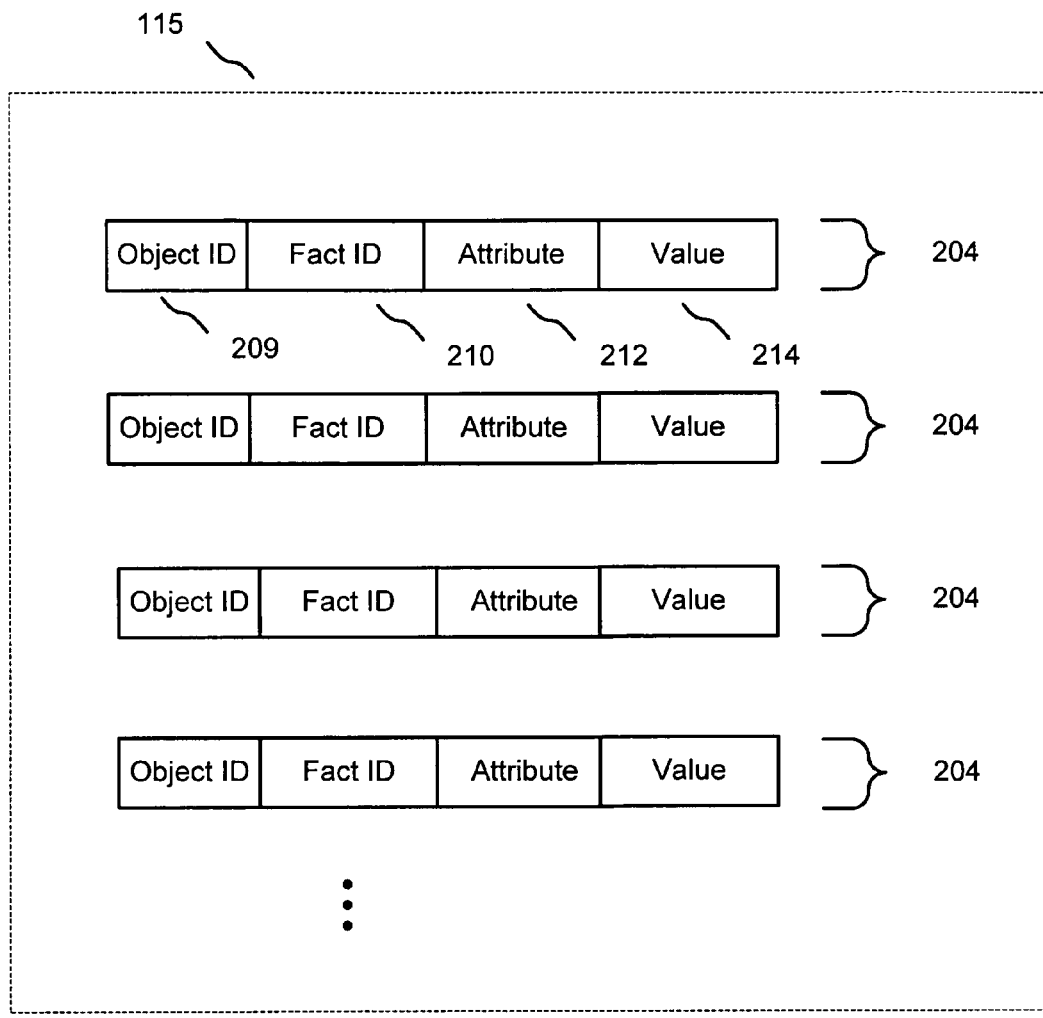
FIGS. 2(a)-2(d) are block diagrams illustrating a data structure for facts within a repository of FIG. 1 in accordance with preferred embodiments of the invention.
Figure 2B:
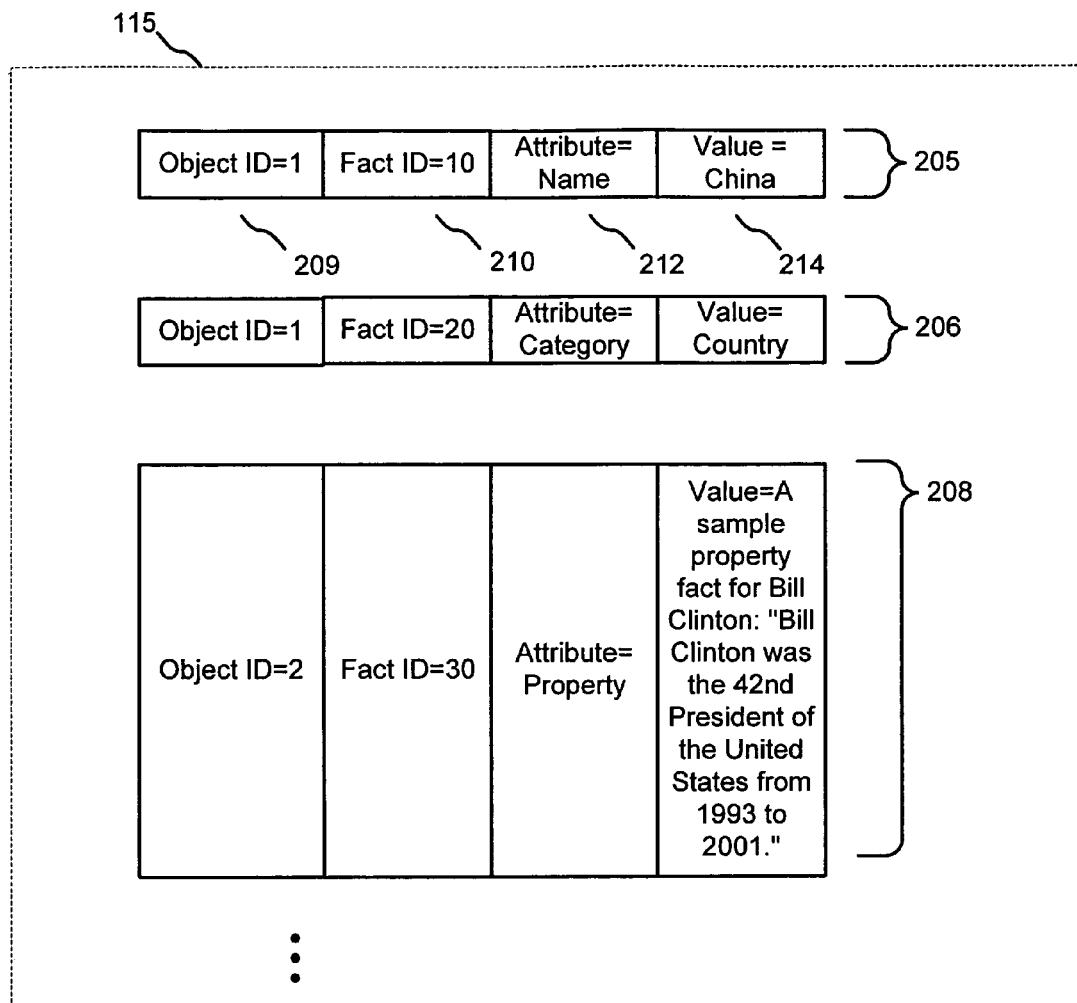
Figure 2C:
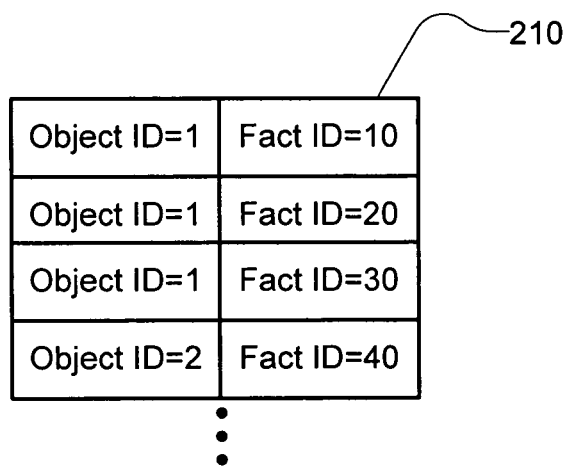
Figure 2D:
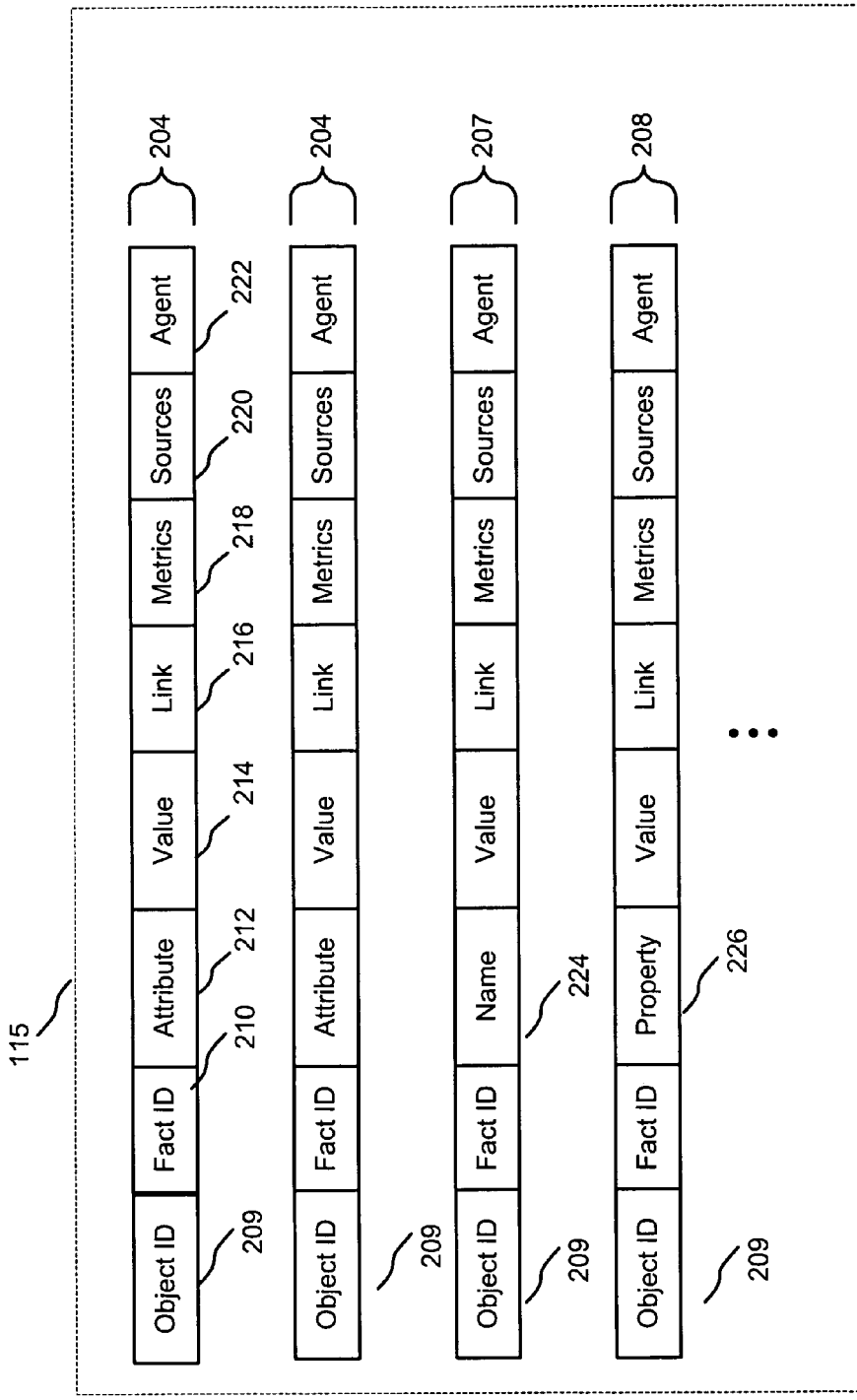
Figure 2E:
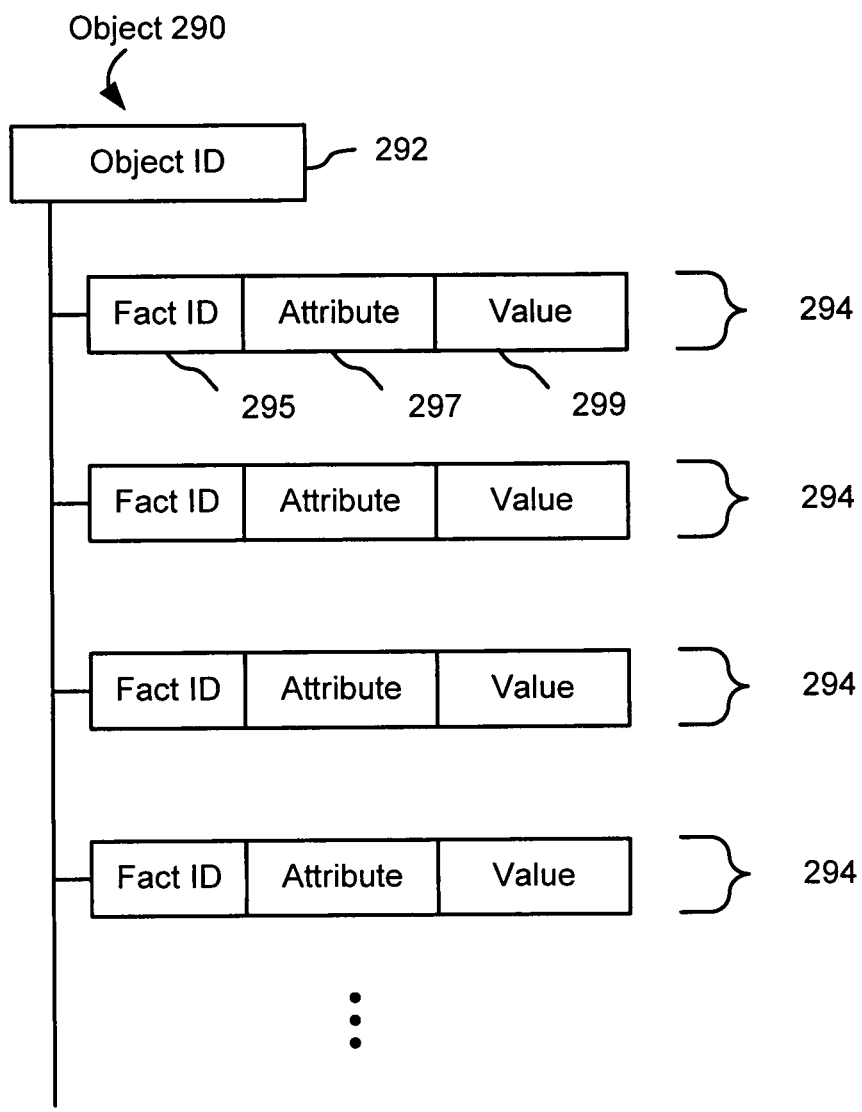
FIG. 2(e) is a block diagram illustrating an alternate data structure for facts and objects in accordance with preferred embodiments of the invention.

FIG. 2(e) is a block diagram illustrating an alternate data structure 290 for facts and objects in accordance with preferred embodiments of the invention. In this data structure, an object 290 contains an object ID 292 and references or points to facts 294. Each fact includes a fact ID 295, an attribute 297, and a value 299. In this embodiment, an object 290 actually exists in memory 107.

Figure 3:
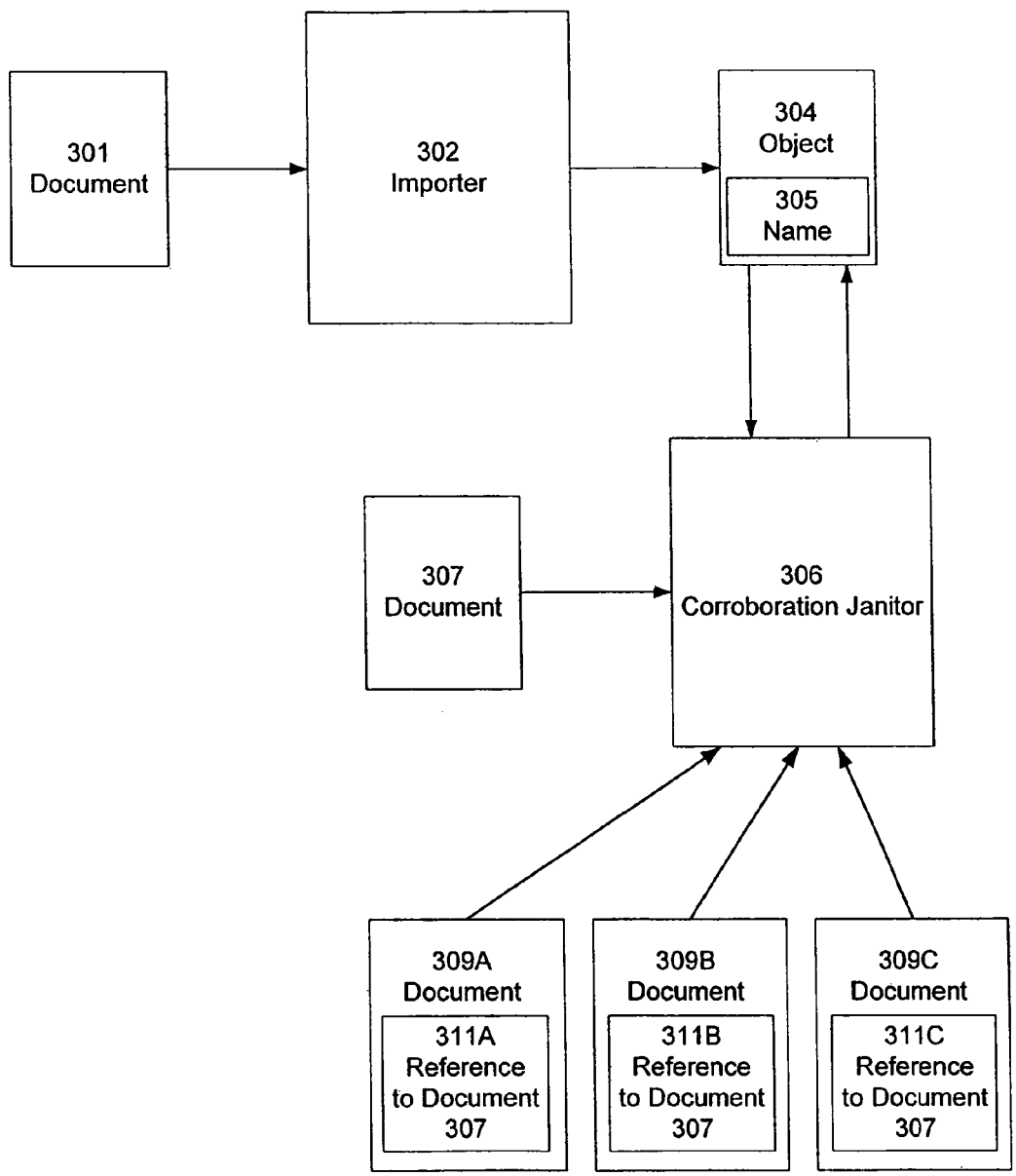
FIG. 3 is a data flow diagram illustrating a corroboration janitor, according to one embodiment of the present invention.

FIG. 3 is a data flow diagram illustrating a corroboration janitor, according to one embodiment of the present invention. As described above, a document 301 is processed by an importer 302, resulting in an object 304. The facts of the object 304 are corroborated by the corroboration janitor 306 through consultation of a document 307. The resulting information is then stored in the object 304, or, alternatively, in a separate corroborated object (not shown). In a preferred embodiment, the document 301 is distinct from the document 307.

As described above, the object 304 may explicitly exist in an object repository, or it may exist merely as a collection of facts with a common object ID. Reference is made to particular objects for the purposes of illustration; one of skill in the art will recognized that the systems and methods described herein are applicable to a variety of implementations and that such references are not limiting.

The object 304 has a name 305. According to one embodiment of the present invention, the name of the object 304 is implemented as a fact associated with the object 304. In another embodiment, the object exists as a set of facts and the name 305 is a fact associated with the same object ID as the set of facts.

The document 307 contains information which may or may not be relevant to the object 304. If the corroboration janitor 306 determines that the document 307 is relevant to the object 304, the corroboration janitor 306 uses the document 307 to corroborate the object 304. According to one embodiment of the present invention, the corroboration janitor 306 iterates over a collection of documents in a repository. Each document and the anchor text of the references pointing to it are analyzed to determine if the document describes an object in the object repository. If the corroboration janitor 306 determines that the document describes an object in the object repository, such as the object 304, the corroboration janitor 306 corroborates the object 304 using the document.

To facilitate determining if the document 307 is relevant to the object 304, the corroboration janitor 306 receives a plurality of documents 309. Each document 309 includes a reference 311 to document 307. References 311 may include, for example, hyperlinks, pointers, or descriptors, but other examples of references may be used without departing from the scope of the present invention. The documents 309 may further contain references (not shown) to documents other than document 307.

Each reference 309 includes some anchor text. Anchor text is text that is presented to a user in association with the reference. For example, the reference can be a HTML hyperlink:

<A HREF="http://maps.google.com"> Revolutionary User Interface </A>

In this example, "Revolutionary User Interface" would be the anchor text of the reference. According to the HTML protocol "Revolutionary User Interface" would be presented to the user in association with a reference to the document found at "http://maps.google.com".

The references 311 are similar in that they refer to document 307, but the anchor text of each may vary among the various references 311. For example, the reference 311A may have anchor text "Banff" while the reference 311B has anchor text "ski resort". Also, the anchor text may be common among some of the various references 311. For example, references 311A and 311C, may both have the anchor text "Banff". The set of all anchor text for references to the document 307 forms a set of candidate anchor texts.

The corroboration janitor 306 may also receive other documents and inputs not shown. A method used by the corroboration janitor, according to one embodiment of the present invention, is described herein with reference to FIGS. 4-6. By consulting the object name 305, the document 307, and the references 311 to document 307, the corroboration janitor is capable of using anchor text to more accurately corroborate the object 304.

For the purposes of illustration, a single document 307 is shown for corroborating the object 304. In a preferred embodiment, a plurality of documents 307 and documents 309 are used by the corroboration janitor 306. Corroboration using a plurality of documents 307 may be performed iteratively, in parallel, or both. According to one embodiment of the present invention, the documents 307 may be filtered to select documents likely to be relevant to the object 304. For example, the documents 307 may be documents that contain in them certain distinguishing facts of the object 304, making them likely candidates for corroboration. According to another embodiment of the present invention, a group of objects could be filtered to select an object 304 to which the document 307 (or set of documents 307) will be relevant.

Figure 4:
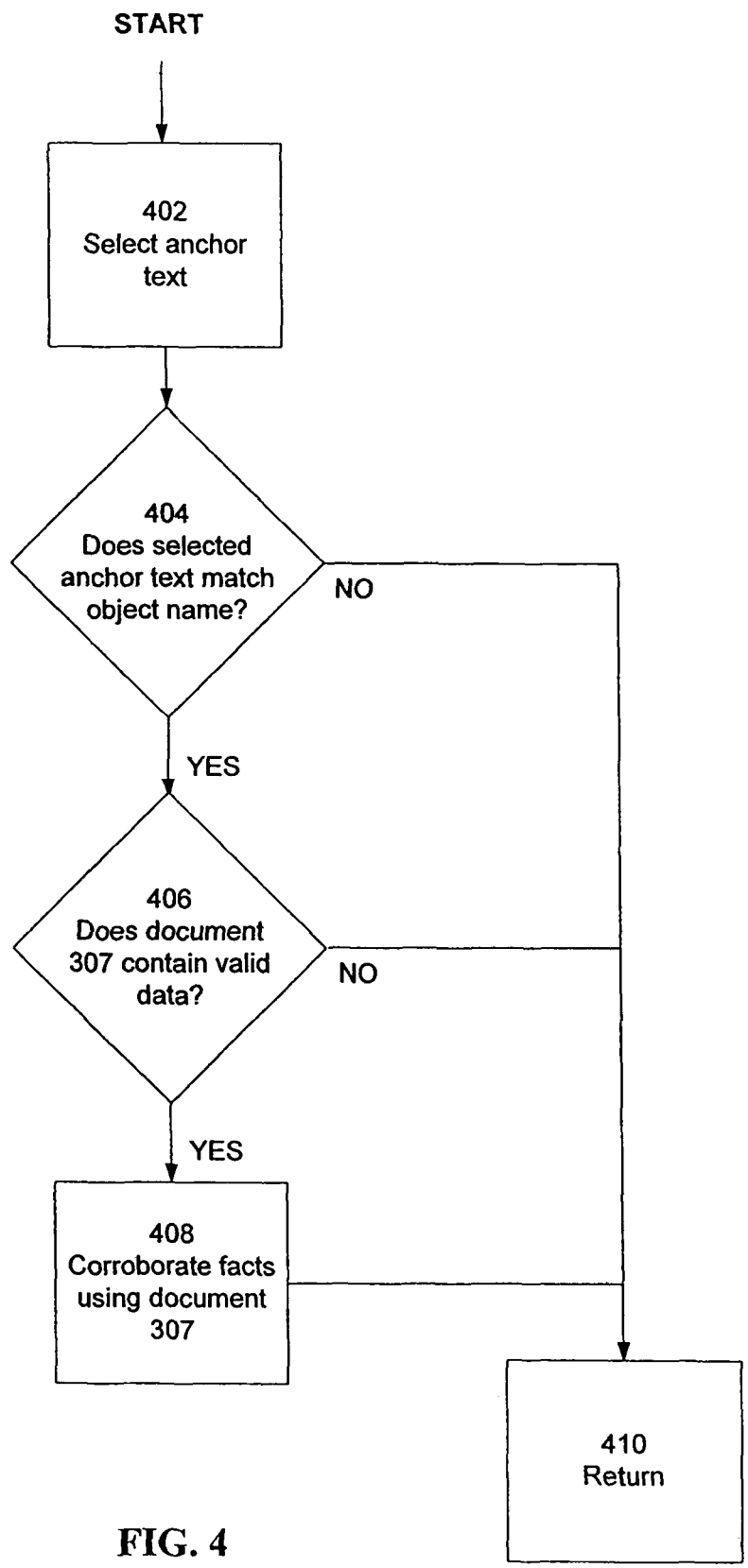
FIG. 4 is a flow chart illustrating a method for corroborating facts, according to one embodiment of the present invention.

FIG. 4 is a flow chart illustrating a method for corroborating facts, according to one embodiment of the present invention. While the method is described herein for the purposes of illustration as being performed by a corroboration janitor, the method is also useful in other contexts in which it is desired to corroborate information with an identifier such as a name against other information, for example, information gathered from the world wide web.

According to one embodiment of the present invention, a set of candidate anchor texts is received by the corroboration janitor 306 and the corroboration janitor 306 selects 402 anchor text from the set of candidate anchor texts. The set of candidate anchor texts is the set of all the anchor texts of the references to the document described herein with reference to FIG. 3. A method for selecting 402 anchor text, according to one embodiment of the present invention, is described herein with reference to FIG. 5.

According to another embodiment of the present invention, selecting 402 anchor text is optional and the received anchor text is equivalent to the selected anchor text. Selecting anchor 402 may be superfluous, for example, when only one anchor text is contained in the references 311, or when all of the anchor texts in the references 311 are to be iteratively used for the purposes of corroboration.

The corroboration janitor 306 determines 404 if the selected anchor text matches the name 305 of the object 304. Determining 404 if the selected anchor text matches the name 305 of the object 304 may be performed using a variety of methods. For example, the corroboration janitor 306 may determine 404 if the selected anchor text matches the name of the object by comparing the selected anchor text to the name 305. Such a comparison may be performed using a variety of thresholds. Different thresholds may be useful for different purposes. For example, in one application it may be desirable to require that the selected anchor text be a character-by-character duplicate of the name, while in another application more variance between the selected anchor text and the name may be tolerated while still considering the two a match.

If the corroboration janitor 306 determines 404 that the selected anchor text does not match the name 305 of the object 304, the corroboration janitor 306 returns 410. FIG. 4 illustrates corroboration using a single document 307. In a preferred embodiment, the corroboration janitor 306 iteratively attempts to corroborate the object 304 using a variety of documents, and returning 410 causes the corroboration janitor 306 to attempt to corroborate the object 304 using a different document 307.

If the corroboration janitor 306 determines 404 that the selected anchor text matches the name 305 of the object 304, the corroboration janitor 306 determines 406 if the document 307 contains valid data. The corroboration janitor 306 may determine 406 if the document 307 contains valid data, for example, by analyzing either individually or in combination the selected anchor text, the document 307, and the name 305 of the object 304. A method for determining if a document contains valid data, according to one embodiment of the present invention, is described herein with reference to FIG. 6.

If the corroboration janitor 306 determines 406 that the document 307 does not contain valid data, the corroboration janitor 306 returns 410. If the corroboration janitor 306 determines 406 that the document 307 contains valid data, the corroboration janitor 306 corroborates the facts of the object 304 using the document 307. A method for corroborating facts is described in U.S. application Ser. No. 11/097,688, entitled "Corroborating Facts Extracted from Multiple Sources", incorporated by reference above. Further techniques relevant to the corroboration of facts may be found in the other applications incorporated by reference above.

By determining if the anchor text matches the name associated with the object 304, the corroboration janitor 306 beneficially limits corroboration to documents likely to be relevant to the object 304, thereby increasing the effectiveness and trustworthiness of the corroboration.

Figure 5A:
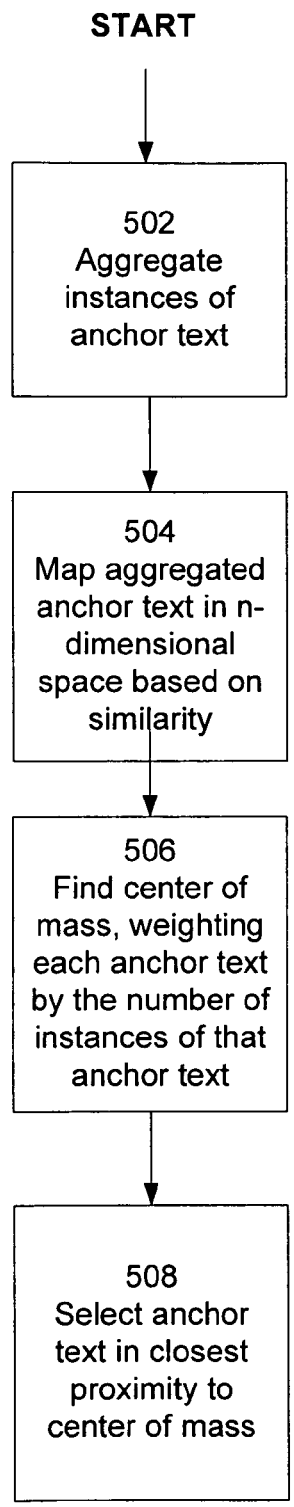
FIG. 5(a) is a flow chart illustrating a method for selecting anchor text from a set of candidate anchor texts.
Figure 5B:
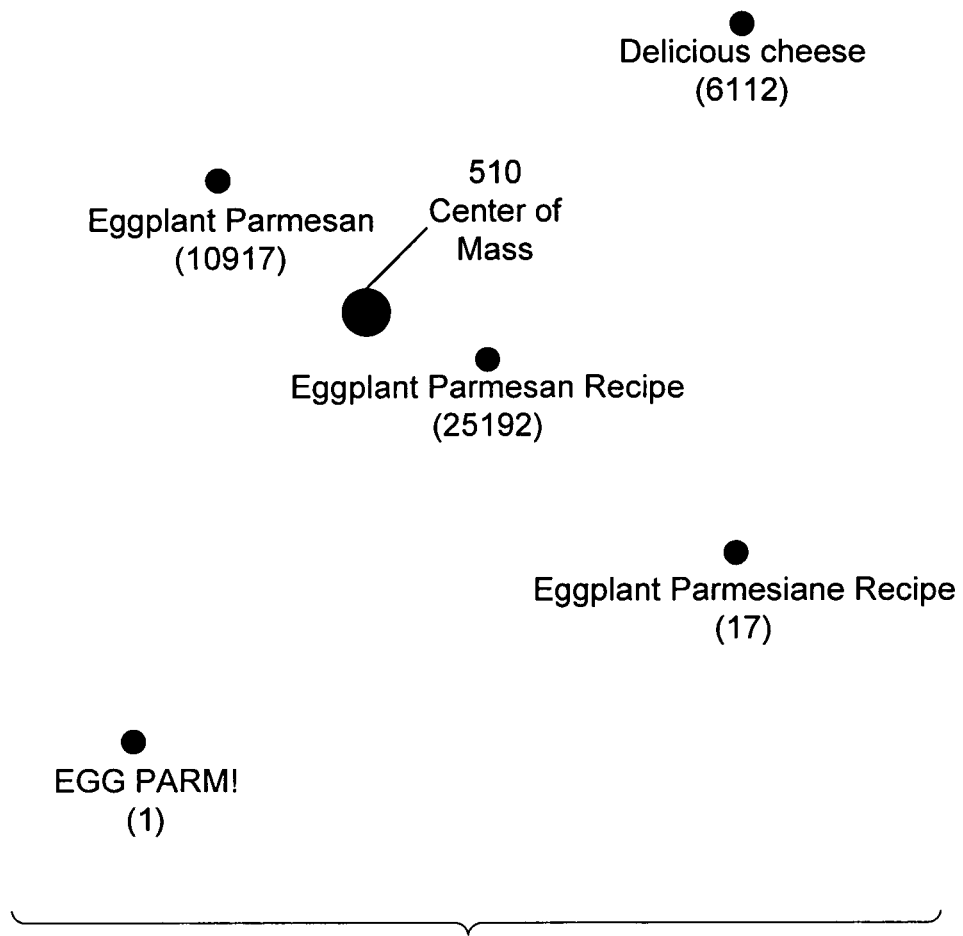
FIG. 5(b) is an example illustrating a method for selecting anchor text from a set of candidate anchor texts.

FIG. 5(a) is a flow chart illustrating a method for selecting anchor text from a set of candidate anchor texts. FIG. 5(b) is an example illustrating a method for selecting anchor text from a set of candidate anchor texts. According to one embodiment of the present invention, the method is performed by the corroboration janitor 306. While the method is described herein for the purposes of illustration as being performed by a corroboration janitor, the method is also useful in other contexts in which it is desired to select an instance of text from a set of candidate texts. The method described with reference to FIGS. 5(a) and 5(b) is herein referred to as n-gram clustering. A similar method for n-gram clustering, also applicable to selecting anchor text from a set of candidate anchor texts, is described in U.S. application Ser. No. 11/142, 765, entitled "Identifying the Unifying Subject of a Set of Facts", incorporated by reference above.

The method starts with a set of candidate anchor texts. In the described embodiment, all the candidate anchor texts refer to the same document 307. The corroboration janitor 306 aggregates 502 the instances of anchor text within the set. Aggregating 502 the instances of anchor text within the set tallies the number of repeated occurrences of the same anchor text. For example, in a set having hundreds of candidate anchor texts, it is quite likely that some of those anchor texts may be repeated. These repeated anchor texts may be identified and organized by their frequency.

FIG. 5(b) illustrates the aggregation of 42,239 instances of anchor text in a set of candidate anchor texts. The anchor text has been aggregated, and the set of candidate anchor texts is represented as five unique instances: "Delicious cheese", occurring 6112 times, "Eggplant Parmesan", occurring 10917 times, "Eggplant Parmesan Recipe", occurring 25192 times, "Eggplant Parmesiane Recipe", occurring 17 times, and "EGG PARM!", occurring 1 time.

The corroboration janitor 306 maps 504 the aggregated anchor texts in n-dimensional space based on the similarity among the aggregated anchor texts, where n can be any integer. According to a preferred embodiment, the corroboration janitor 306 maps the aggregated anchor text in 2023-dimensional space. More similar aggregated anchor text is mapped more closely, and less similar aggregated anchor text is mapped farther apart. FIG. 5(b) illustrates a two-dimension mapping by similarity of the aggregated anchor texts. For example, "Eggplant Parmesan" and "Eggplant Parmesan Recipe" are comparatively close, while "Delicious cheese" and "Eggplant Parmesiane Recipe" are comparatively remote.

The corroboration janitor 306 finds 506 the center of mass of the aggregated and mapped anchor texts, wherein each aggregated and mapped anchor text is weighted by the number of instances of that anchor text. FIG. 5(b) illustrates a the center of mass 510 that has been calculated. The center of mass 510 reflects both the relative n-space proximity and the frequency of the anchor texts in the set of candidate anchor texts. "Eggplant Parmesan", for example, occurs thousands of times, and therefore will greatly influence the center of mass 510. "EGG PARM!", however, occurs only once, and therefore will have minimal impact on the center of mass 510.

According to one embodiment of the present invention, various metrics may be used to weight the various anchor texts for the calculation of the center of mass. For example, the various anchor texts can be weighted according to some score (such as PageRank) based on their source. Other metrics will be apparent to one of skill in the art without departing from the scope of the present invention.

The corroboration janitor 306 selects 508 the anchor text closest in proximity to the center of mass. In the example illustrated in FIG. 5(b), "Eggplant Parmesan Recipe" would be selected, because it is the closest anchor text to the center of mass 510.

Selecting anchor text based on an n-gram clustering method such as the one described herein beneficially is beneficially capable of considering the influence of a large set of candidate text. By weighting each anchor text by its frequency, the influence of numerical outliers is reduced and the likelihood of an accurate summarization of the set of candidate anchor text is increased. By determining the center of mass based on the similarity among the anchor texts, there is a high likelihood of selecting an anchor text with significantly common features with the other members of the set of candidate anchor texts.

According to another embodiment of the present invention, the corroboration janitor 306 aggregates the instances of anchor text within the set and selects the most frequent instance.

Figure 6:
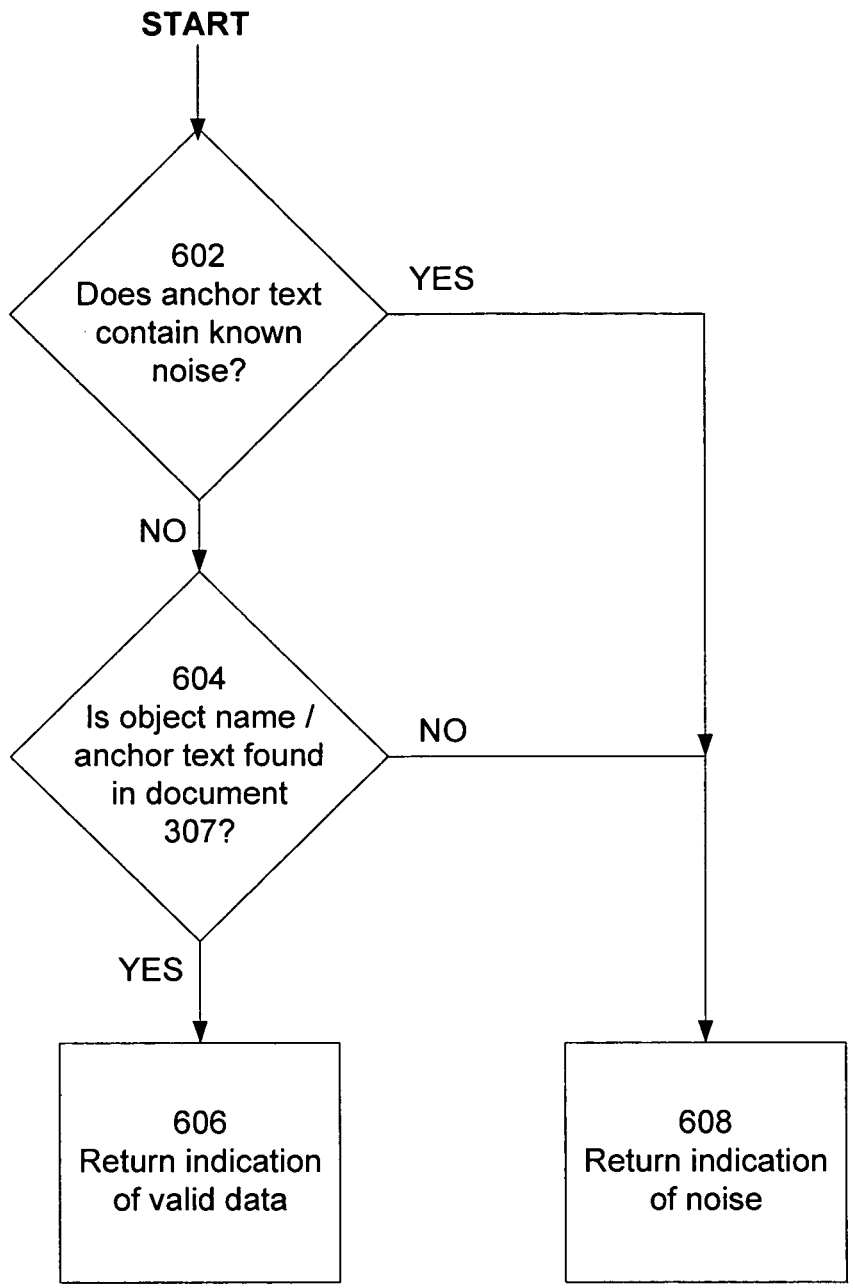
FIG. 6 is a flow chart illustrating a method for determining if a document contains valid data.

FIG. 6 is a flow chart illustrating a method for determining if a document contains valid data. According to one embodiment of the present invention, the method is performed by the corroboration janitor 306. While the method is described herein for the purposes of illustration as being performed by a corroboration janitor, the method is also useful in other contexts in which it is desired to determine if a source document contains valid data.

The method begins with anchor text (according to one embodiment of the present invention, the selected anchor text from 402), an object name (the name 305 of the object 304), and the document 307. The corroboration janitor 306 determines 602 if the anchor text contains known noise. For example, the corroboration janitor 306 may analyze the anchor text and attempt to recognize known noise terms such as "click here".

If the corroboration janitor 306 determines 602 that the anchor text contains known noise, the corroboration janitor 306 returns 608 an indication of noise, beneficially preventing the corroboration janitor 306 from using the document 307 for the purposes of corroboration. Alternatively, returning 608 an indication of noise may cause the corroboration janitor 306 to select a different anchor text. According to one embodiment of the present invention, despite the indication returned by the corroboration janitor 306, the document 307 may be used by other janitors.

If the corroboration janitor 306 determines 602 that the anchor text does not contain known noise, the corroboration janitor 306 determines 604 if the object name and/or anchor text is found in the document 307. According to one embodiment of the present invention, if the document 307 is an HTML document, the corroboration janitor 306 looks specifically in the HTML header to determine if the header contains the object name and/or anchor text. For example, the corroboration janitor 306 may search for text in between tags indicating a title of the document 307.

If the corroboration janitor 306 determines 604 that the object name and/or anchor text is not found in the document 307, the corroboration janitor 306 returns 608 an indication of noise. If the corroboration janitor 306 determines 604 that the object name and/or anchor text is found in the document 307, the corroboration janitor 306 returns 606 an indication of valid data. According to one embodiment of the present invention, returning 606 an indication of valid data would allow the corroboration janitor 306 to use the document 307 for the purposes of corroboration. By determining that the object name and/or anchor text is found in the document before corroborating the object, that corroboration janitor 306 beneficially ensures that the document is relevant to the object in question, thereby increasing confidence in the document and improving the quality of corroboration.

Because the anchor text used in references to a document typically describe the content of that document, comparing anchor text to an object name helps to determine if the document and the object refer or describe the same entity- and therefore if the document can reliably be used to corroborate the facts known about that object. Anchor text, however, can often contain noise, or can misleadingly suggest that a document is relevant to a topic to which it is not in fact relevant. By determining if the document contains the object name (or the anchor text), the impact of such misleading anchor text can be beneficially reduced, and the most relevant documents applied to an object for the purposes of corroboration.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for corroborating a set of facts included in a fact repository, the method comprising:
   at a back end computer system including one or more processors and memory storing one or more programs, the one or more processors executing the one or more programs to perform the operations of:
   identifying a set of facts associated with an object, the set of facts having been previously extracted from multiple documents, each fact comprising an attribute-value pair, including a fact attribute type and a fact value, and wherein the object is associated with an entity having a name fact attribute type;
   receiving a first document not included in the multiple documents and a reference to the first document, said reference comprising user-viewable anchor text extracted from a second document;
   determining that the user-viewable anchor text matches the name of the entity associated with the object;
   determining that one or both of the name of the entity associated with the object or the user-viewable anchor text appears in the first document; and
   responsive to determining that the user-viewable anchor text matches the name of the entity associated with the object and that one or both of the name of the entity associated with the object or the user-viewable anchor text appears in the first document, corroborating the set of facts using the first document;
   the corroborating comprising:
   identifying one or more facts in the first document, each identified fact having an attribute-value pair; and
   comparing a respective attribute-value pair of the set of facts to an identified attribute-value pair in the first document; and
   updating the set of facts in accordance with the corroborating, wherein the updating includes one or both of storing an attribute-value pair from the first document in the set of facts in association with the object or adjusting a status of an attribute-value pair of the set of facts.

2. The method of claim 1, wherein receiving the reference to the document comprises receiving a set of candidate anchor texts, and wherein determining if the anchor text matches the name of the entity associated with the object comprises:
   selecting an anchor text from the set of candidate anchor texts; and
   determining if the selected anchor text matches the name of the entity associated with the object.

3. The method of claim 2, wherein selecting the anchor text from the set of candidate anchor texts comprises aggregating the set of candidate anchor texts.

4. The method of claim 2, wherein selecting the anchor text from the set of candidate anchor texts comprises performing n-gram clustering on at least one member of the set of candidate anchor texts.

5. The method of claim 1, further comprising:
analyzing the first document to determine if the first document contains data likely to be relevant to the object.

6. The method of claim 5, wherein the data likely to be relevant to the object comprises the name of the entity associated with the object.

7. The method of claim 6, wherein the first document comprises an HTML document comprising a header, and wherein analyzing the first document includes searching the header of the HTML document for the name of the entity associated with the object.

8. The method of claim 5, wherein the data likely to be relevant to the object comprises anchor text.

9. The method of claim 8, wherein the first document comprises an HTML document comprising a header, and wherein analyzing the first document includes searching the header of the HTML document for the anchor text.

10. The method of claim 1, further comprising:
analyzing the anchor text to determine if the first document contains data likely to be relevant to the object.

11. The method of claim 10, wherein analyzing the anchor text to determine if the first document contains data likely to be relevant to the object comprises comparing the anchor text to a list of known noise text.

12. The method of claim 1, wherein the name of the entity associated with the object comprises an object name.

13. The method of claim 1, wherein the set of facts comprises an object.

14. The method of claim 1, wherein adjusting the status includes marking the attribute-value pair as proper for retention in the set of facts.

15. The method of claim 1, wherein adjusting the status includes marking the attribute-value pair for deletion from the set of facts.

16. The method of claim 1, wherein adjusting the status includes marking the attribute-value pair as proper for access from the set of facts.

17. The method of claim 1, wherein the name of the entity is selected from the group consisting of: a person's name, a place name, a company name, and an organization name.

18. A back end computer system for corroborating a set of facts included in a fact repository, the system comprising:
one or more processors; memory; and
one or more programs stored in the memory, the one or more programs comprising instructions to:
identify a set of facts associated with an object, the set of facts having been previously extracted from multiple documents of a collection of documents, each fact comprising an attribute-value pair, including a fact attribute type and a fact value, and wherein the object is associated with an entity having a name fact attribute type;
receive a first document not included in the multiple documents from the collection of documents and a reference to the first document, said reference comprising user-viewable anchor text extracted from a second document from the collection of documents;
determine that the user-viewable anchor text matches the name of the entity associated with the object;
determine that one or both of the name of the entity associated with the object or the user-viewable anchor text appears in the first document; and
responsive to determining that the user-viewable anchor text matches the name of the entity associated with the object and that one or both of the name of the entity associated with the object or the user-viewable anchor text appears in the first document, corroborate the set of facts using the first document;
the corroborating comprising:
identifying one or more facts in the first document, each identified fact having an attribute-value pair; and
comparing a respective attribute-value pair of the set of facts to an identified attribute-value pair in the first document; and
update the set of facts in accordance with the corroborating, wherein the updating includes one or both of storing an attribute-value pair from the first document in the set of facts in association with the object or adjusting a status of an attribute-value pair of the set of facts.

19. The system of claim 18, wherein said set of facts comprises an object, and wherein said name comprises an object name.

20. A non-transitory computer readable storage medium storing one or more programs for execution by one or more processors of a back end computer system, the one or more programs and comprising instructions for:
identifying a set of facts associated with an object, the set of facts having been previously extracted from multiple documents of a collection of documents, each fact comprising an attribute-value pair, including a fact attribute type and a fact value, and wherein the object is associated with an entity having a name fact attribute type;
receiving a first document not included in the multiple documents from the collection of documents and a reference to the first document, said reference comprising user-viewable anchor text extracted from a second document from the collection of documents;
determining that the user-viewable anchor text matches the name of the entity associated with the object;
determining that one or both of the name of the entity associated with the object or the user-viewable anchor text appears in the first document; and
responsive to determining that the user-viewable anchor text matches the name of the entity associated with the object and that one or both of the name of the entity associated with the object or the user-viewable anchor text appears in the first document, corroborating the set of facts using the first document;
the corroborating comprising:
identifying one or more facts in the first document, each identified fact having an attribute-value pair; and
comparing a respective attribute-value pair of the set of facts to an identified attribute-value pair in the first document; and
updating the set of facts in accordance with the corroborating, wherein the updating includes one or both of storing an attribute-value pair from the first document in the set of facts in association with the object or adjusting a status of an attribute-value pair of the set of facts.

21. The non-transitory computer readable storage medium of claim 20, said computer-readable storage medium further comprising:
program code for analyzing the anchor text to determine if the first document contains valid data.

22. The non-transitory computer readable storage medium of claim 21, wherein said program code for analyzing the anchor text to determine if the first document contains valid data comprises program code for comparing the anchor text to a list of known noise text.

23. The non-transitory computer readable storage medium of claim 20, wherein the name associated with the object comprises an object name.

24. The non-transitory computer readable storage medium of claim 20, wherein the set of facts comprises an object.

25. The non-transitory computer readable storage medium of claim 20, wherein the name of the entity is selected from the group consisting of: a person's name, a place name, a company name, and an organization name.

\* \* \* \* \*